United States Patent
Tsurumaru et al.

[11] Patent Number: 5,964,601
[45] Date of Patent: Oct. 12, 1999

[54] ON-VEHICLE HOLDER OF A PORTABLE TERMINAL DEVICE

[75] Inventors: Shinichiro Tsurumaru; Shuuji Sasaki, both of Kawasaki, Japan

[73] Assignee: Fujitsu Limited, Kawasaki, Japan

[21] Appl. No.: 09/030,006

[22] Filed: Feb. 25, 1998

[30] Foreign Application Priority Data

Mar. 26, 1997 [JP] Japan ..................................... 9-073734

[51] Int. Cl.[6] .................................................. H01R 13/44
[52] U.S. Cl. ........................... 439/141; 439/341; 439/929
[58] Field of Search ..................................... 439/141, 140, 439/341, 359, 297, 298, 929

[56] References Cited

U.S. PATENT DOCUMENTS

| | | | |
|---|---|---|---|
| 5,142,124 | 8/1992 | Driessen et al. | 439/929 |
| 5,273,462 | 12/1993 | Huser et al. | 439/341 |
| 5,312,263 | 5/1994 | Zapalski et al. | 439/140 |

*Primary Examiner*—Neil Abrams
*Assistant Examiner*—J. F. Duverne
*Attorney, Agent, or Firm*—Armstrong, Westerman, Hattori, McLeland, & Naughton

[57] ABSTRACT

A holder of a portable device includes a depression for accepting a portable device detachably, a clamp mechanism for clamping the portable device in the depression, a terminal pin provided in the depression for electrical contact with the portable device, and a movable protective cover provided in the depression so as to cover the terminal pin, the movable protective cover being adapted to engage the portable device when it held in the depression properly and is constructed so as to be movable in an elongating direction of the terminal element between a first position covering the terminal element and a second position exposing the terminal element, the movable protective cover being urged to the second position when the portable device is mounted upon the depression.

17 Claims, 21 Drawing Sheets

FIG. I

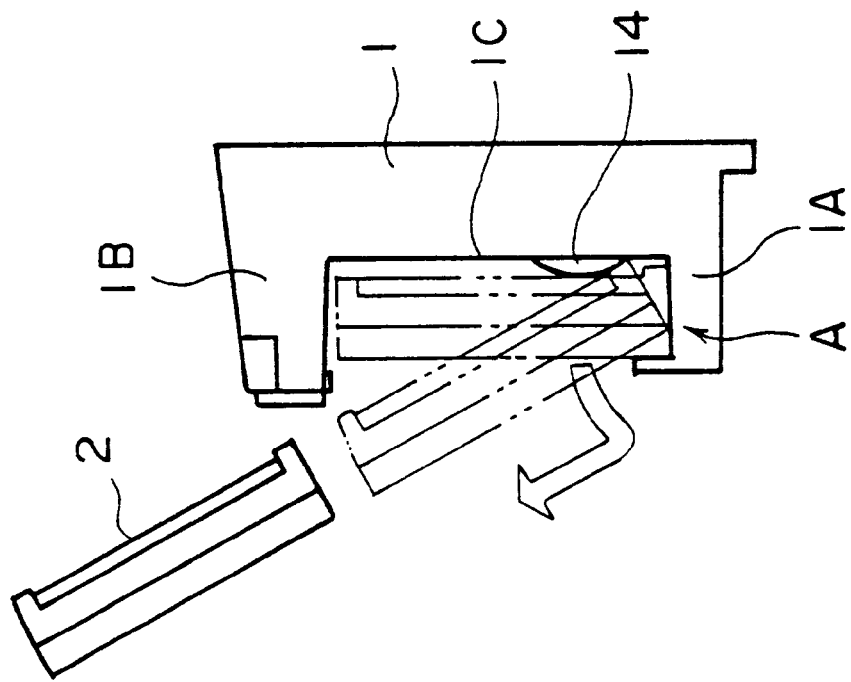
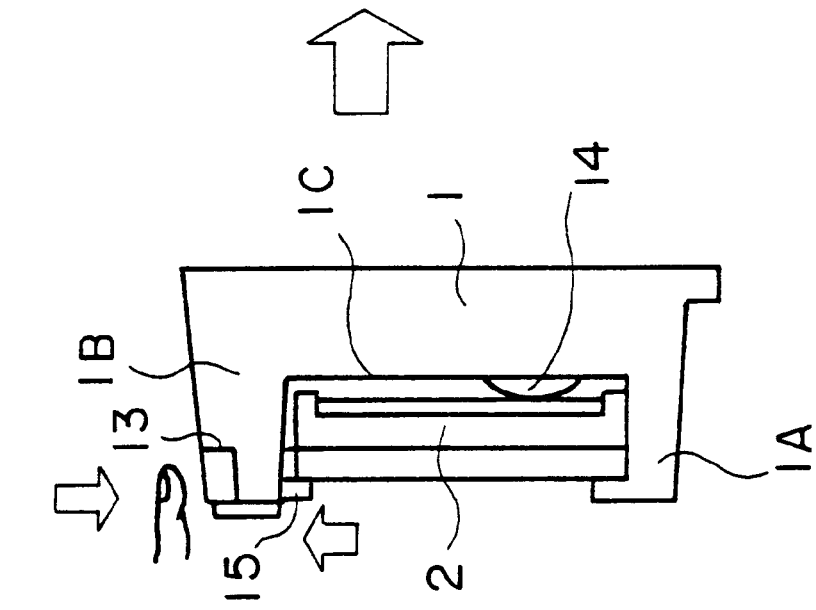

F I G. 21
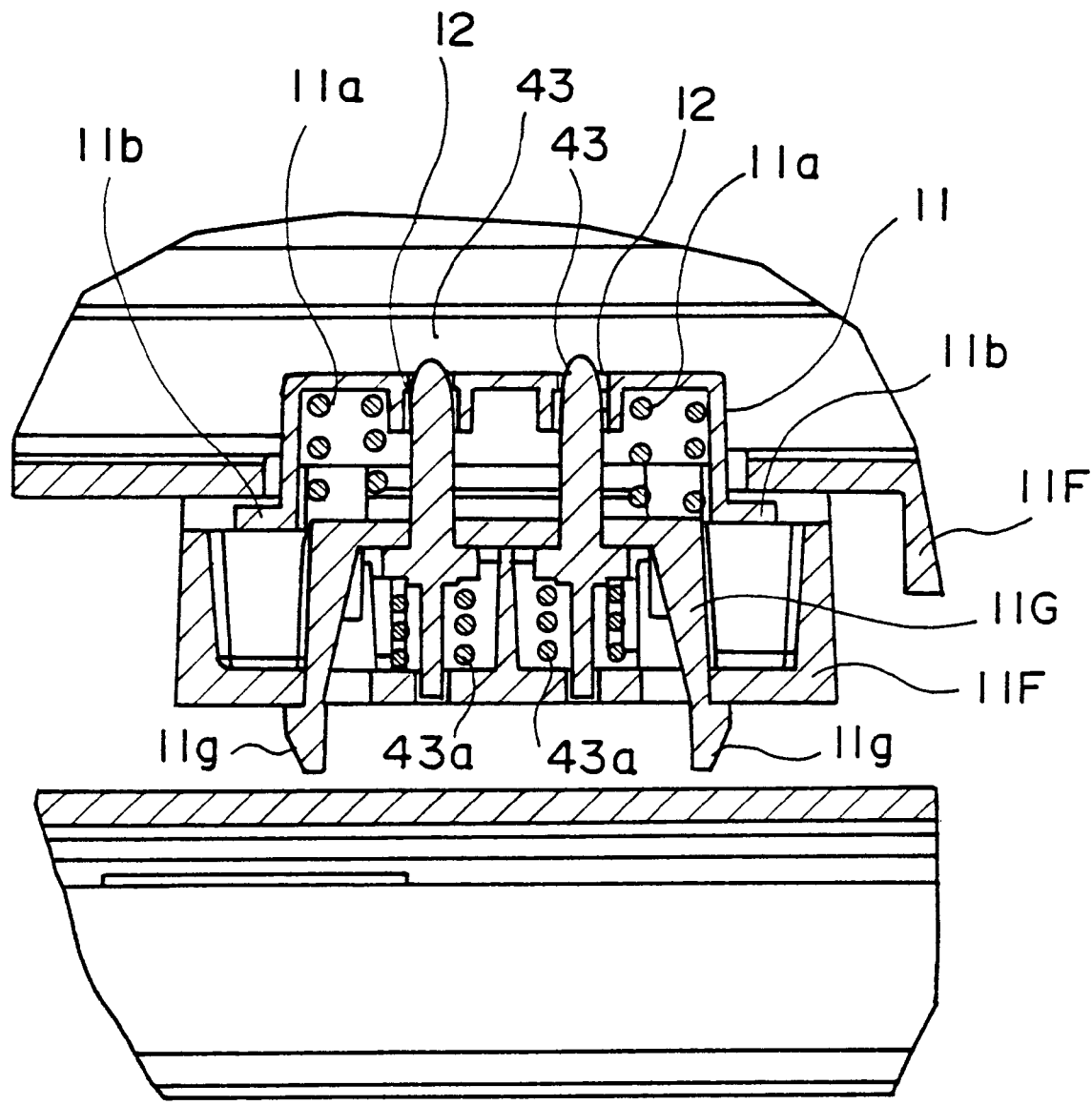

ON-VEHICLE HOLDER OF A PORTABLE TERMINAL DEVICE

BACKGROUND OF THE INVENTION

The present invention generally relates to holders of portable devices and more particularly to an on-vehicle holder for use in vehicles for supplying electric power to a portable terminal device detachably mounted thereon.

Portable terminals are used extensively in these days for inventory control in stores or warehouses, delivery of parcels, inspection of meters such as water, gas or electricity, and the like. Such portable terminals generally include therein a rechargeable battery as a power source.

When delivering parcels, for example, a person on a delivery vehicle inputs various information to the portable terminal device on the site of delivery of the parcel. The information typically includes, although by no means limited, the destination of the delivered parcel, designation of the parcel, date of the delivery, result of the delivery, and the like.

During a long time use of the portable terminal device outside the delivery vehicle, the battery in the portable terminal may lose the power. When this occurs, the portable terminal device is no longer usable for inputting information. Further, there arises a possibility that the information already input to the portable terminal device may be lost.

In order to avoid such a loss of information, the portable terminal is usually mounted, after the delivery personnel has returned to the delivery vehicle, on a holder that is provided on the vehicle for recharging the battery of the portable terminal device. In stores or warehouses, too, the portable terminal is mounted on a fixed holder connected to a power line for recharging the battery when the portable terminal device is not in use.

It should be noted that a typical holder performs the function of recharging the battery and also the function of reading out the information that is input into and held in the portable terminal device. The recharging of the battery and the reading of the information can be conducted concurrently.

For the purpose of recharging of the battery, the holder includes a recharging terminal element for contact with a corresponding terminal element of the portable terminal device. Thereby, the rechargeable battery of the portable terminal device is charged by a large capacity battery of the vehicle. The details of recharging the battery is outside the scope of the present invention and further description will be omitted. There are various known circuits and procedures for recharging a battery.

In a holder of a portable terminal device for use in vehicles, there arises a problem in that a substantial vibration is applied to the holder when the vehicle is moving. As the portable terminal device is mounted only in a detachable state, the vibration may be amplified substantially.

When a severe vibration or shock is applied to the portable terminal device during the state that the battery of the portable terminal device is in a recharging process, there is a substantial risk that the portable terminal device causes a displacement in the holder and the positional relationship between the holder and the portable terminal device is changed variously. In the worst case, the contact of the terminal elements may be lost. Thereby, the recharging of the battery becomes unstable and insufficient.

In order to conduct the recharging process stably, it is necessary to maintain a constant contact state of the terminal elements between the holder and the portable terminal device, while conventional holder has suffered from the problem that such a constant contact state is difficult to be maintained. The same applies also to the contact terminals used for sending and receiving information.

When constructing a holder capable of securing a stable contact between the contact terminal elements of the holder and the contact terminal elements of the portable terminal device, it is necessary to avoid any contact of the contact terminal elements of the holder with the body of the portable terminal device as the portable terminal device is mounted or dismounted to or from the holder. When such a contact occurs, the fragile contact terminals may experience a permanent mechanical deformation. In addition to the foregoing, the holder should allow easy and quick mounting and dismounting of the portable terminal device so that the user of the portable terminal device does not feel any inconvenience in the use of the portable terminal device.

SUMMARY OF THE INVENTION

Accordingly, it is a general object of the present invention to provide a novel and useful holder wherein the foregoing problems are eliminated.

Another and more specific object of the present invention is to provide a holder in which a stable electrical contact is maintained between a terminal element of the holder mechanism and a corresponding terminal element of a portable terminal device mounted thereon even when a severe vibration or shock is applied to the holder and the portable terminal device.

Another object of the present invention is to provide a holder adapted for holding a portable device detachably, said holder comprising:

depression formed in a body of said holder for accepting said portable device detachably;

a clamp mechanism for clamping said portable device in a state that said portable device is held in said depression;

a terminal element provided in said depression for electrical contact with said portable device; and a movable protective cover provided in said depression so as to cover said terminal element, said movable protective cover being adapted to engage said portable device when said portable device is held in said depression, said movable protective cover being movable in an elongating direction of said terminal element between a first position covering said terminal element and a second position exposing said terminal element, said movable protective cover being urged to said second position when said portable device is mounted upon said depression.

Another object of the present invention is to provide a holder adapted for holding a device detachably, comprising:

a holder body holding said device detachably; and a clamp mechanism for clamping said device in a state that said device is held on said holder body;

said clamp mechanism including:

a movable clamp member movable between a clamp position in which said movable clamp member engages said device held on said holder body and a release position in which said clamp mechanism is disengaged from said device held on said holder body;

a clamp spring urging said movable clamp member to said clamp position;

a release lever engaging said movable clamp member for causing said movable clamp member to return to said release position in response to an actuation of said release lever;

a movable contact member connected mechanically to said movable clamp member, said movable contact member being adapted for engagement with said portable device held on said holder body, said movable contact member thereby causing said movable clamp member to disengage from said release lever in said release position for causing said movable contact member to move to said clamp position.

Another object of the present invention is to provide a holder adapted for holding a portable device detachably, comprising:

a holder body holding said portable device detachably; and a contact structure provided on said holder body in electrical contact with said portable device held on said holder body, said contact structure comprising:
  a contact pin movable; and
  a movable cover member covering said contact pin, said movable cover member being movable in an elongating direction of said contact pin and including a hole exposing said contact pin;
  said movable cover exposing said contact pin at said hole when said portable device is mounted on said holder body, said movable cover covering said contact pin when said portable device is removed from said holder body.

Another object of the present invention is to provide a holder adapted for holding a portable device detachably, comprising:

a holder body holding said portable device detachably; and a contact structure provided on said holder body in electrical contact with said portable device held on said holder body, said contact structure comprising:
  a contact pin movable in an elongating direction thereof;
  a connection arm having a first end and a second end, said first end being connected rigidly to said contact pin so as to be movable in said elongating direction of said contact pin; and
  an engagement pin provided on said second end of said connection arm for engagement with said portable device mounted upon said holder body, such that said connection arm and said contact pin are movable together with said portable device mounted upon said holder body.

According to the present invention, the fragile terminal element of the holder is covered and protected by the movable protective cover in the state that the portable terminal device is removed from the holder. As the slidable protective cover moves only in the elongating direction of the terminal element, the problem of the terminal element being bent laterally by a force exerting laterally when mounting or dismounting the portable terminal device is successfully eliminated. The terminal element is exposed only when the portable terminal device is mounted properly on the holder. By forming the terminal element also movable in the elongating direction thereof, it is possible to maintain a stable electrical contact between the holder and the portable terminal device even when a severe shock or vibration is applied to the holder and the portable terminal device. Thereby, a stable recharging of battery of the portable terminal device or a stable transfer of data from the portable terminal device to a host device via the holder is achieved successfully.

Other objects and further features of the present invention will become apparent from the following detailed description when read in conjunction with the attached drawings.

BRIEF DESCRIPTION OF THE DRAWINGS

FIGS. 4A and 4B are diagrams showing a dismounting operation of a portable terminal device from the holder of the first embodiment;

FIG. 21 is a diagram showing the details of contact used in the holder of the second embodiment.

DETAILED DESCRIPTION OF THE PREFERRED EMBODIMENTS

[FIRST EMBODIMENT]

Figure 1:
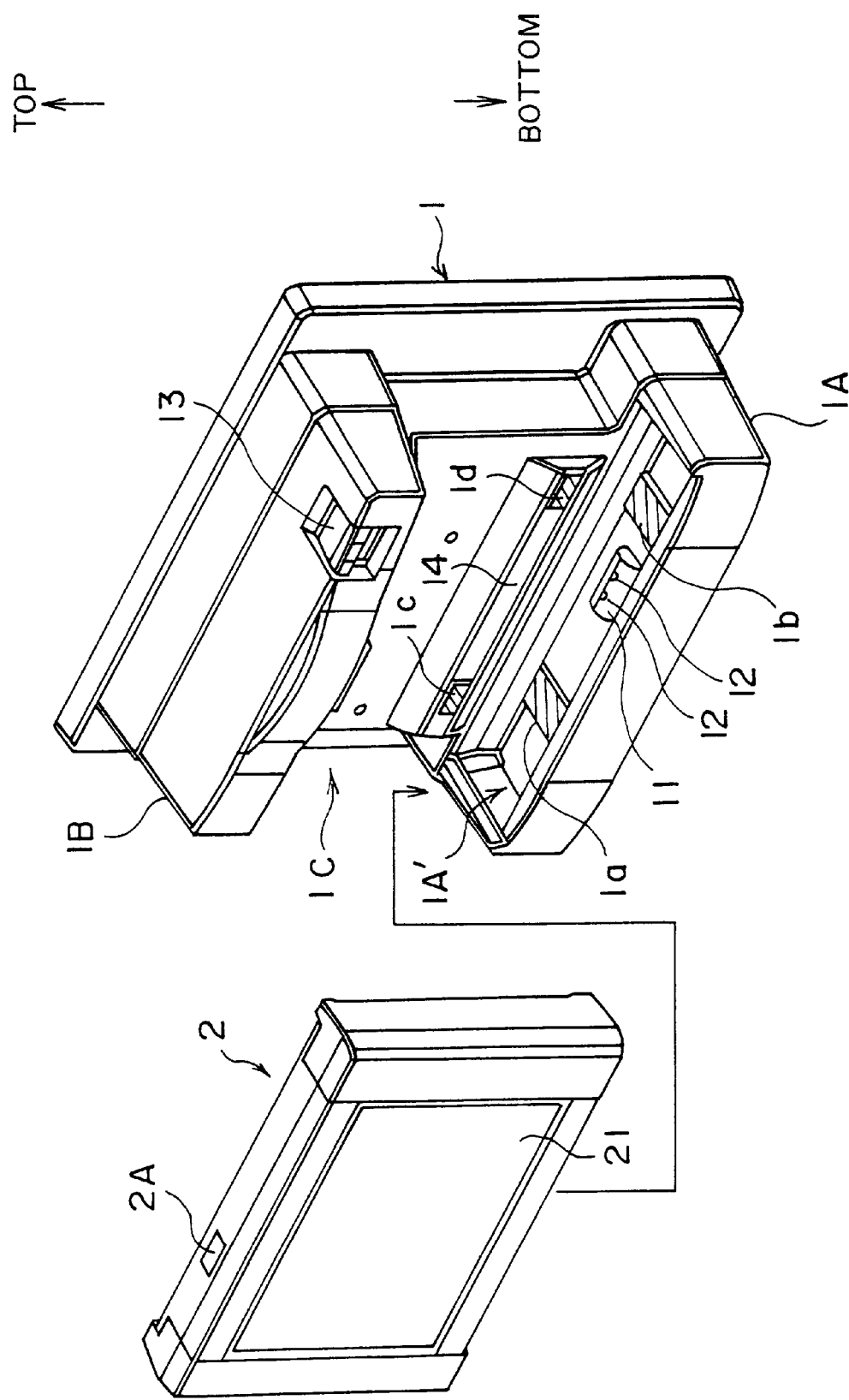
FIG. 1 is a diagram showing the construction of a holder of a portable terminal device according to a first embodiment of the present invention in a state that the portable terminal device is dismounted from the holder.

FIG. 1 shows the overall view of an on-vehicle holder 1 and a portable terminal device 2 mounted thereon in an oblique view in the state that the portable terminal device 2 is detached from the on-vehicle holder 1.

Referring to FIG. 1, the on-vehicle holder 1 is used in a vehicle such as the one used for delivering parcels, and the portable terminal 2 carries a display surface 21 of a liquid crystal panel on a front side thereof. The display surface 21 may also act as a touch panel for the user of the portable terminal device to input information, for example by touching the items displayed on the display surface 21. Further, the portable terminal 2 may include a numeric key pad and/or various functional keys on the front side thereof adjacent to the display surface 21.

The portable terminal device 2 includes therein a rechargeable battery, and the electric power of the portable terminal device 2 is obtained from the rechargeable battery. When not in use, the portable terminal device 2 is mounted on the holder 1 for recharging the battery. For this purpose, the holder 1 includes a contact terminal element for contacting with a corresponding contact terminal element that is provided at a bottom part of the portable terminal device 2 in the illustrated example of FIG. 1.

As will be explained later in detail, the foregoing contact terminal element on the holder 1 for recharging the battery is covered by a protective cover 11 of a semi-cylindrical shape, for avoiding a deformation of the contact terminal element caused by an external force. It should be noted that the protective cover 11 is formed with a pair of openings 12, and the contact terminal element is accommodated in each of the openings 12 in the state of FIG. 1. A more detailed description of the protective cover 11 will be made later.

As can be seen in FIG. 1, the holder 1 has a generally U-shaped form in the elevational cross-sectional view taken along a hypothetical vertical cross-sectional plane, with a central depression 1C, defined by lower and upper base parts 1A and 1B, for accepting the portable terminal device 2 therein as indicated by an arrow. Further, a depression 1A' is formed in the lower base part 1A for accepting a bottom part of the portable terminal device 2 when the portable terminal device 2 is to be mounted on the holder 1. In order to facilitate the mounting of the portable terminal device 2 on the holder 1, the holder 1 includes a ridge-shaped guide projection 14 in the depression, and the guide projection 14 guides the bottom part of the portable terminal device 2 into the depression 1A' as the portable terminal device 2 is inserted into the depression 1C as indicated in FIG. 1. In order to avoid a mechanical shock at the time of mounting or dismounting of the portable terminal device 2 on or from the holder 1, resilient shock absorbers 1a and 1b are formed in the depression 1A'. Similar shock absorbers 1c and 1d are formed also on the guide projection 14.

The holder 1 further includes a lock mechanism 15 (not shown in FIG. 1) to be described later in detail for holding the mounted portable terminal device 2 firmly, wherein a release button 13 is provided in the upper base part for releasing the lock mechanism.

The portable terminal device 2 includes a window 2A for infrared data accessing (IRDA) on a top part thereof.

Figure 2:
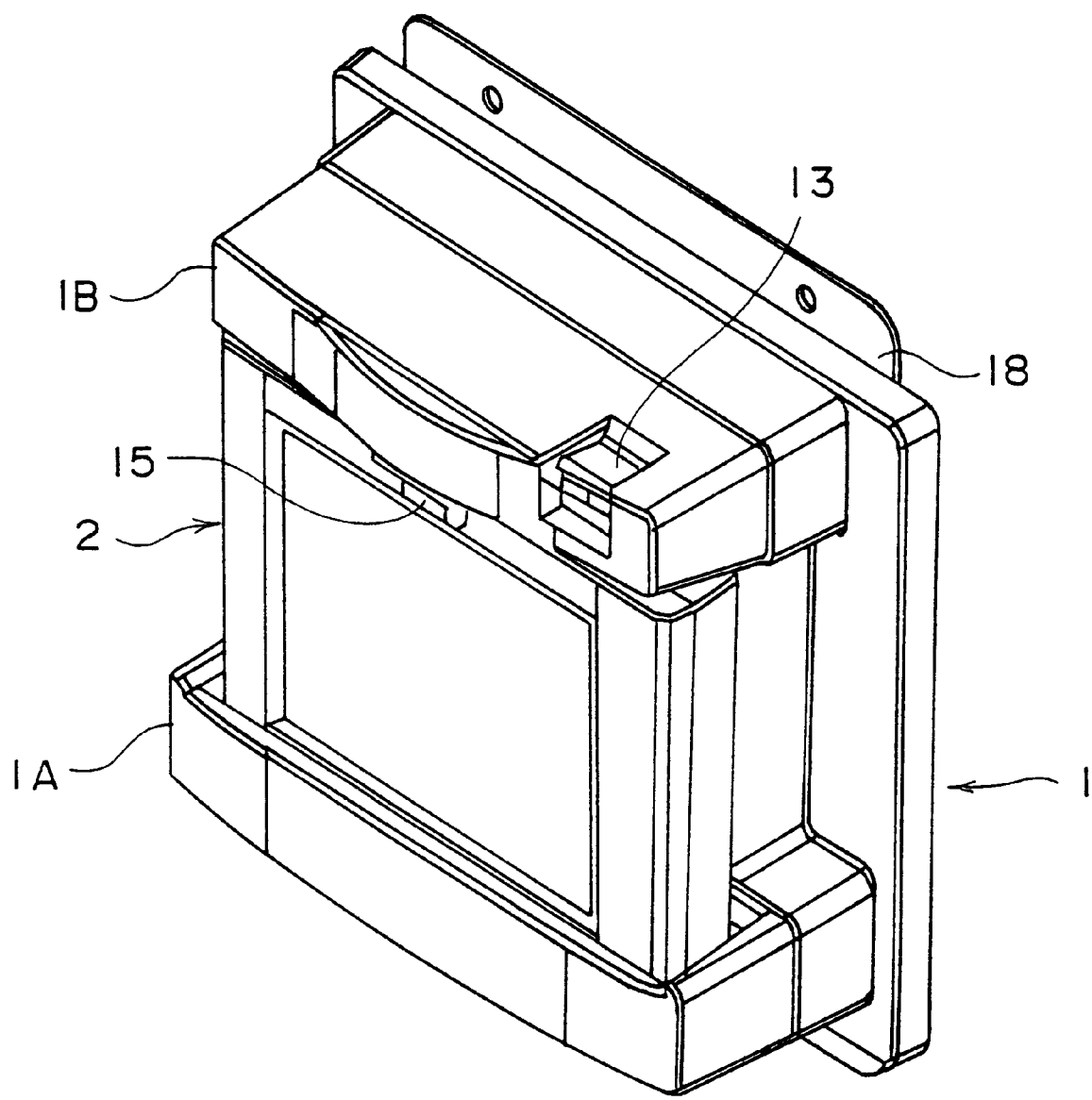
FIG. 2 is a diagram showing the construction of the portable terminal device of the first embodiment in a state in which the portable terminal device is mounted on the holder.

FIG. 2 shows the portable terminal device 2 and the holder 1 in the state that the portable terminal device 2 is mounted on the holder 1 of FIG. 1, wherein those parts corresponding to the parts described previously are designated by the same reference numerals and the description thereof will be omitted.

Referring to FIG. 2, the bottom part of the portable terminal device 2 is mounted into the depression 1A' formed in the lower base part 1A of the holder 1 as described before, wherein the guide projection 14 on the holder 1 described in FIG. 1 engages the rear surface of the portable terminal device 2 in the state of FIG. 2. In FIG. 2, it should be noted that the holder 1 includes a fix plate 18 for mounting the holder 1 on a frame or an appropriate part of the vehicle, and the fix plate 18 includes screw holes for this purpose. Similar screw holes are formed also in the bottom part of the holder 1, see FIG. 7.

While shown only partially, FIG. 2 shows the lock mechanism 15 that engages the front surface of the portable terminal device 2 at the top part thereof. In the illustrated example, the lock mechanism 15 has a roller-shaped lock member for direct engagement with the portable terminal device 2. As explained already, the lock mechanism 15 includes the release button 13 in the upper right portion of the holder 1. Detailed construction and function of lock mechanism 15 will be described later.

Figure 3A:
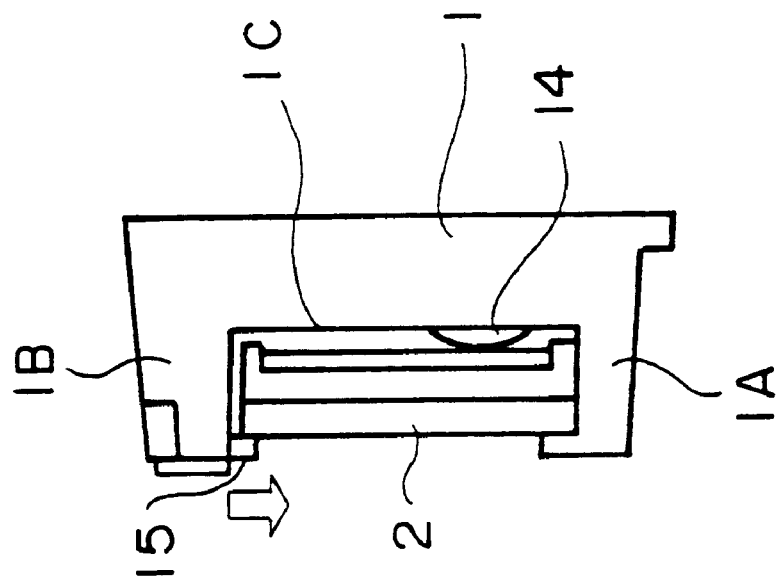
FIGS. 3A and 3B are diagrams showing a mounting operation of a portable terminal device on the holder of the first embodiment.
Figure 3B:
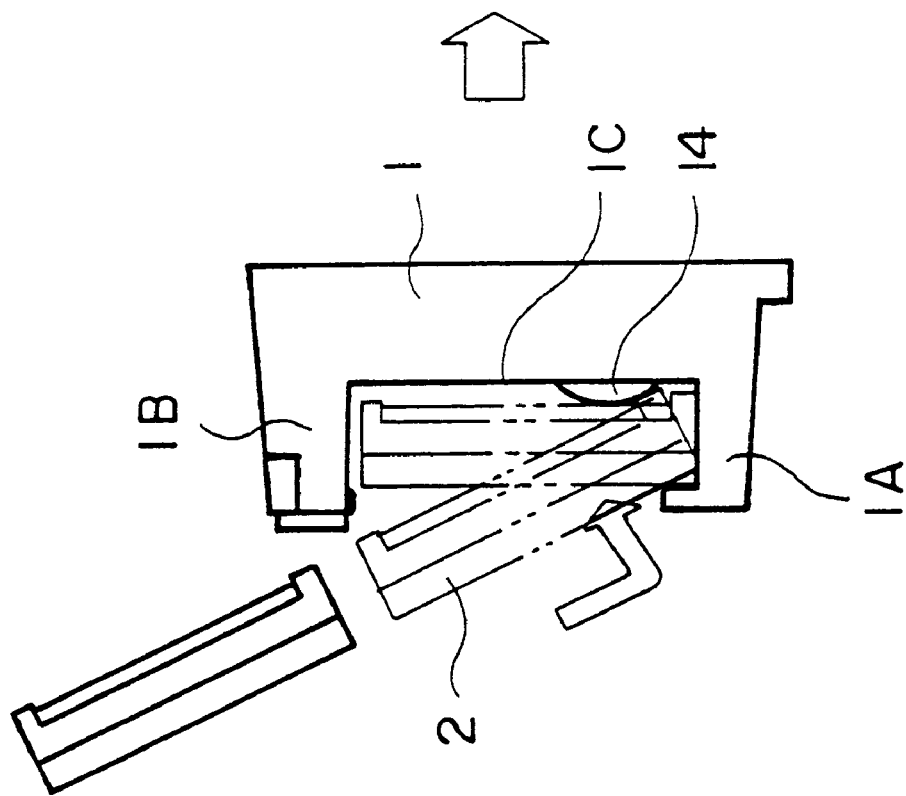

FIGS. 3A and 3B show the mounting of the portable terminal device 2 on the holder 1, wherein FIG. 3A shows the state in which the portable terminal device 2 is mounted half-way, while FIG. 3B shows the state in which the portable terminal device is fully mounted.

Referring to FIG. 3A, the portable terminal device 2 is inserted into the depression 1A' formed in the lower base part 1A obliquely from the upper direction while using the guide projection 14 as a guide. It should be noted that the guide projection 14 is defined by a slope optimized for guiding the inserted portable terminal device 2 into the depression 1A'.

Upon engagement of the bottom part of the portable terminal device 2 with the bottom of the depression 1A', the upper edge of the portable terminal device 2 is now pressed to the right as indicated in FIG. 3B. In response to this, the lock mechanism 15 in the upper base part 1B moves in the downward direction and holds the portable terminal device 2 now mounted upon the depression 1C of the holder 1 firmly.

FIGS. 4A and 4B show the process of dismounting the portable terminal device 2 from the holder 1.

Referring to FIG. 4A, the lock mechanism 15 holding the mounted portable terminal device 2 is released by pressing down the release button 13, and the released lock mechanism 15 is retracted into the upper base part 1B in response thereto.

Next, in the step of FIG. 4B, the portable terminal device 2 is tilted by pulling out the top part thereof in the outward direction. The portable terminal device 2 is then lifted in the upward direction.

Figure 5:
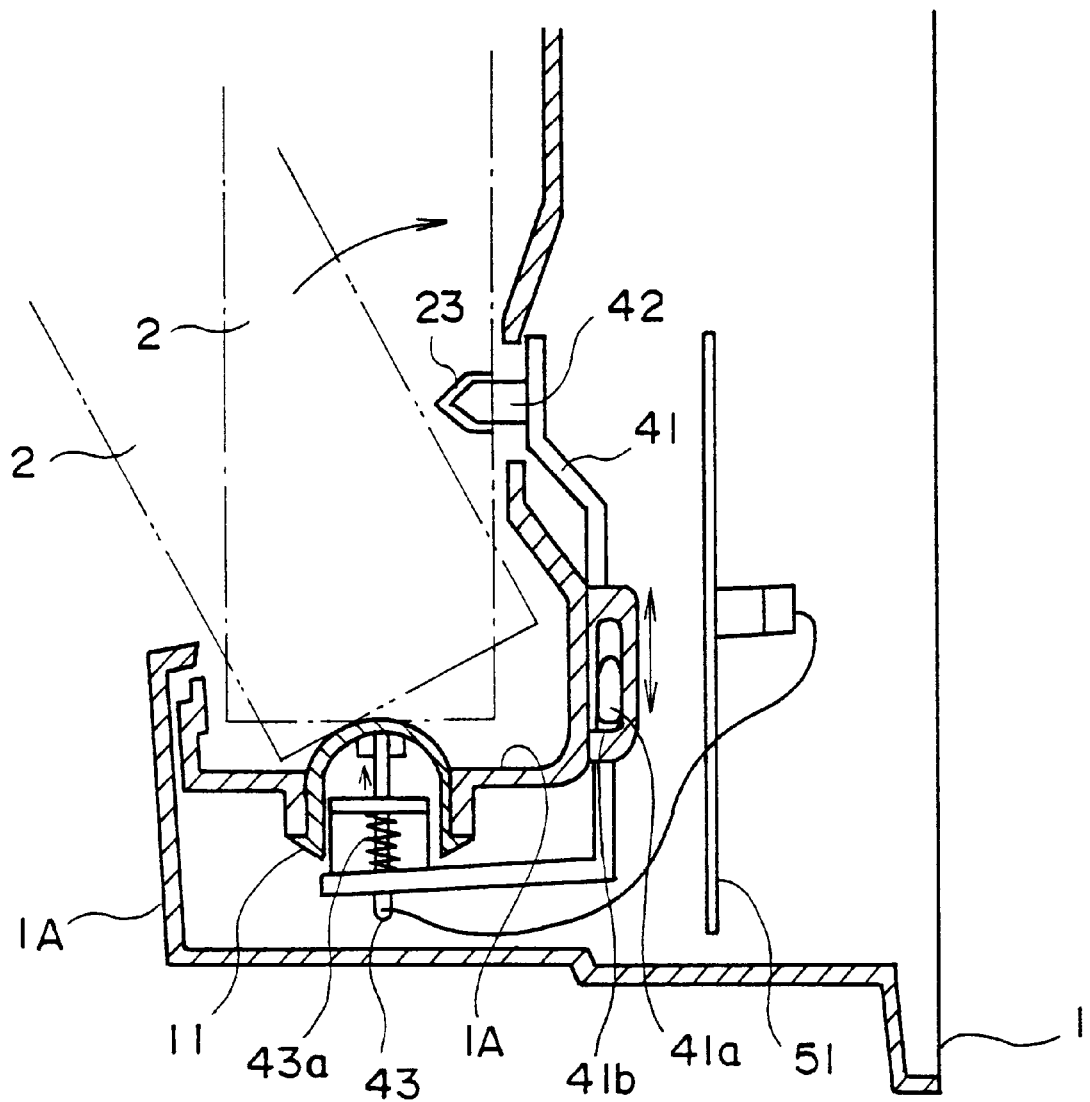
FIG. 5 is a diagram showing the details of the holder of the first embodiment.

FIG. 5 shows the details of a bottom part A of the lower base part 1A shown in FIG. 4B in detail, wherein FIG. 5 shows the construction of a contact pin 43 forming a part of the on-vehicle holder 1 and provided for recharging the battery in the portable terminal device 2. In FIG. 5, the one-dotted chain represents the portable terminal device 2 in the fully mounted state while the two-dotted chain represents the portable terminal device 2 in the half-mounted state.

Referring to FIG. 5, the contact pin 43 is provided on the bottom depression 1A' of the lower base part 1A of the holder 1 movably and is urged in the upward direction by a spring 43a such that the contact pin 43 engages a corresponding contact terminal element of the portable terminal device 2 with a predetermined urging force. By urging the contact pin 43 by means of the spring 43a, a stable electrical contact is maintained between the holder 1 and the portable terminal device 2, even when a severe shock or vibration is applied to the vehicle operated in a rough road.

In the construction of FIG. 5, it should be noted that the contact pin 43 is protected by the protective cover 11 shown in FIG. 1, wherein it can be seen in FIG. 5 that the protective cover 11 has a semi-cylindrical shape characterized by a semi-circular cross-sectional form. The protective cover 11 is formed of a plastic and is provided movably in the upward and downward directions. As will be explained later with reference to FIG. 15, the protective cover 11 is urged in the upward direction by a spring 11a not shown in FIG. 5. Further, the protective cover 11 is formed with a small aperture 12 at a top part thereof, such that the contact pin 43 appears from the foregoing aperture 12 when the portable terminal device 2 is mounted properly on the holder 1 and the protective cover 11 is pushed in the downward direction against the exerting force of the spring 11a. Otherwise, the contact pin 43 is accommodated in the protective cover 11. Thereby, the problem that the fragile contact pin 43 being bent or deformed by the an external force applied to the contact pin 43 is successfully avoided. Associated with this, the problem that the deformed contact pin failing to make a contact with the corresponding contact terminal element of the portable terminal device 2 is eliminated, and a stable recharging of the battery is guaranteed.

Figure 6:
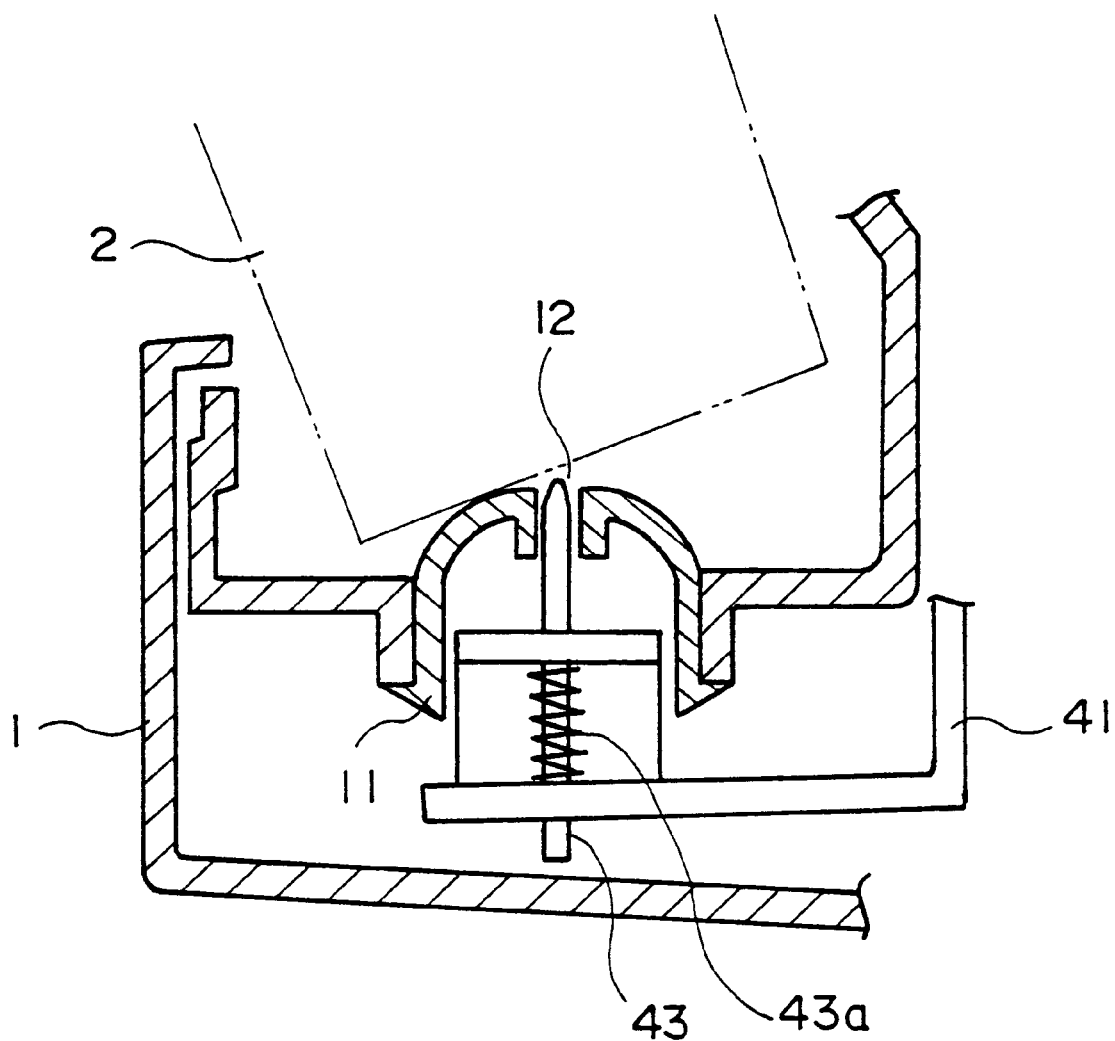
FIG. 6 is a diagram showing a part of FIG. 5 in a further enlarged scale.

As indicated in FIG. 5 or in a further enlarged view of FIG. 6, the bottom of the portable terminal device 2 makes a contact with the protective cover 11 as long as the portable terminal device 2 is inserted obliquely as indicated by the two-dotted line. In this state, the contact pin 43 is accommodated inside the protective cover 11 and the contact pin 43 does not make a contact engagement with the bottom surface of the partially mounted portable terminal device 2. Thereby, the contact pin 43 is well protected from a lateral force exerted thereto and from unwanted deformation caused by such a lateral force. As the protective cover 11 is movable only in the upward and downward directions, the exposure of the contact pin 43 occurs only when the protective cover 11 is pressed vertically in the downward direction.

In the case of removing the portable terminal 2 from the holder 1, the problem such as the contact pin 43 making a contact with the bottom surface of the partially removed portable terminal device 2 or a problem such as the contact pin 43 being deformed as a result of the contact is positively eliminated.

In the state that the portable terminal device 2 is mounted vertically on the holder 1, the terminal device 2 is pushed in the downward direction in FIG. 5. Thereby, the bottom surface of the portable terminal device 2 pushes the protective cover 11 in the downward direction and the contact pin 43 is exposed from the aperture 12 of the protective cover 11. Thereby, the contact pin 43 makes a contact with a corresponding contact terminal element of the portable terminal device 2 and the recharging of the battery of the portable terminal device 2 is started.

Once the portable terminal device 2 is mounted on the holder 1 properly, the movement of the portable terminal device 2 is restricted only in the upward and downward directions. Thereby, the contact pin 43 experiences only a force exerting in the upward or downward direction. As the contact pin 43 extends in the upward and downward directions, the contact pin 43 is less vulnerable to such an urging force acting axially. In addition, the shock applied to the contact pin 43 in the vertical direction may be absorbed effectively by the spring 43a that urges the contact pin 43 resiliently in the upward direction.

Referring back to FIG. 5, it should be noted that the contact pin 43 of the on-vehicle holder 1 is held at an end of an L-shaped movable guide member 41 movable in the upward and downward directions, wherein the movable guide member 41 includes a projection 41a engaged movably with an elongated hole 41b formed in the movable guide member 41. Thereby, the movement of the guide member 41 is restricted in the upward and downward directions as a result of the foregoing engagement of the protection 41a to the elongated hole 41b. It should be noted that the guide member 41 carries on an opposite end thereof an engagement pin 42, wherein the engagement pin 42 engages with a corresponding depression 23 formed on the portable terminal device 2 when the portable terminal device 2 is properly mounted on the holder 1. Once the pin 42 makes an engagement with the corresponding depression 23, the guide member 41 moves together with the movement of the portable terminal device 2 even when a severe vertical shock is applied to the portable terminal device 2.

Thus, by setting the location of the depression 23 on the body of the portable terminal device 2 appropriately or by setting the length of the L-shaped guide member 41 appropriately, the separation between the engagement pin 42 and the contact terminal pin 43 is set to an optimum value for causing the contact pin 43 to engage with the corresponding contact terminal element of the portable terminal device 2 with an optimum urging force. As a result of the optimization of the urging force of the contact pin 43 against the contact terminal element of the portable terminal device 2, a reliable recharging of battery of the portable terminal device 2 is guaranteed even when a severe vertical shock or vibration is applied to the vehicle. It should be noted that the contact terminal element 43 of the portable terminal device 2 is connected to a printed circuit board 51 provided inside the holder 1 for supplying an electric power to the contact pin 43 for recharging the battery of the portable terminal device 2.

Figure 7:
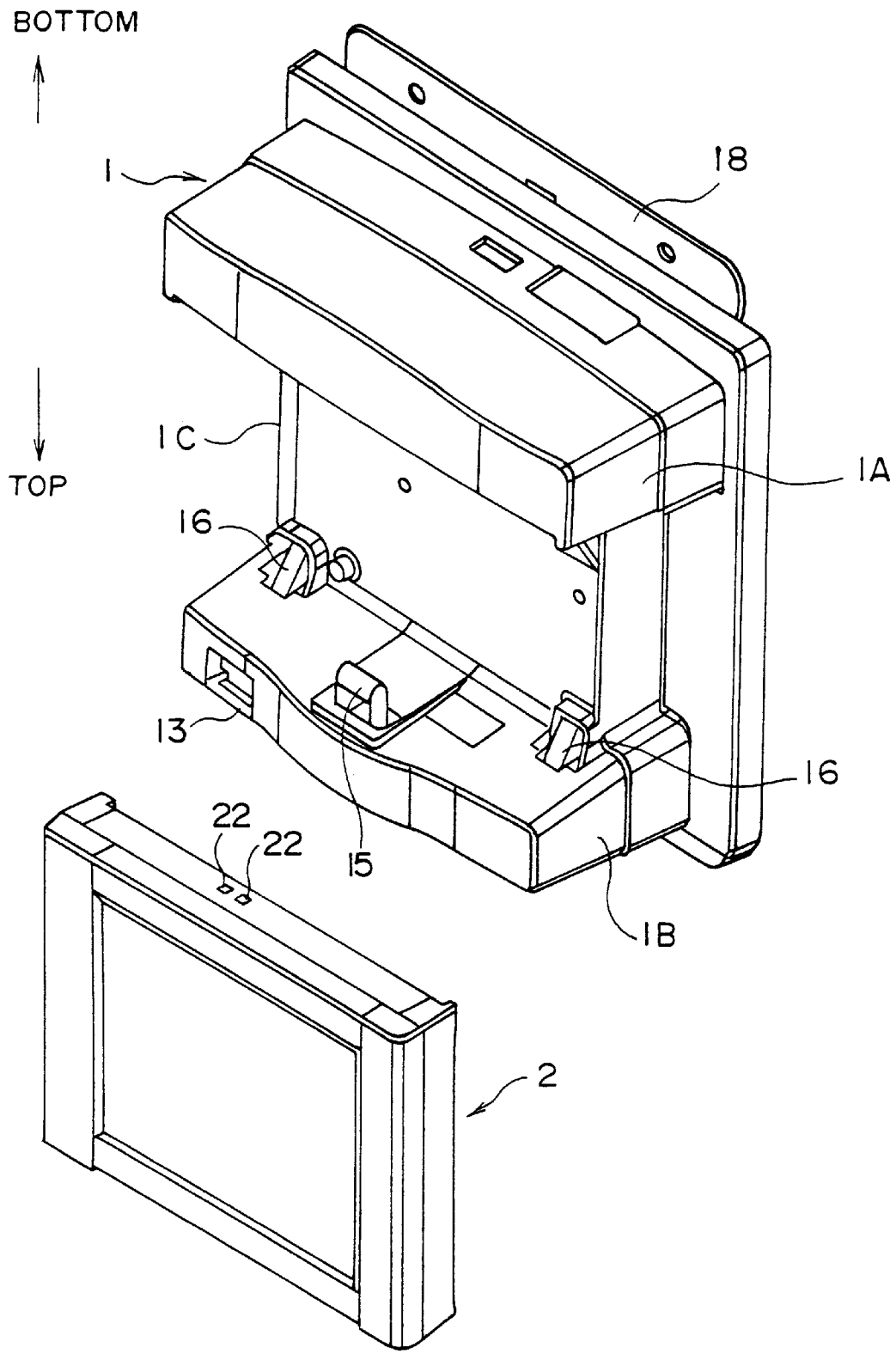
FIG. 7 is a diagram showing the holder of the first embodiment of the present invention in an oblique view as viewed from a bottom direction.

FIG. 7 shows the holder 1 and the portable terminal device 2 in an oblique view as viewed from a bottom direction.

Referring to FIG. 7, it can be seen that the holder 1 includes the lock mechanism 15 in the upper base part 1B of the holder 1 as already noted, wherein FIG. 7 shows the lock mechanism 15 in the state that the lock mechanism 15 is lowered for holding the portable terminal device 2 held in the depression 1C. As explained already, the lock mechanism 15 includes a roller-like catch member for direct engagement with the portable terminal device 2.

On the bottom side of the portable terminal device 2, it can be seen that there are provided a pair of apertures 22 for accepting the contact pin 43 of the holder 1 explained already.

When the portable terminal 2 is set upon the holder 1 properly, the contact pins 43 are inserted into the aperture 22 for contact with the corresponding contact terminal elements inside the aperture 22, and the supply of electric power from the holder 1 to the rechargeable battery inside the portable terminal device 2 is achieved.

FIG. 7 also shows resilient members 16 provided on the upper base part 1B at both lateral edges thereof for supporting the rear surface of the portable terminal device 2 mounted upon the depression 1C of the holder 1. As will be described later in detail, the resilient members 16 may be formed of a leaf spring carrying thereon a small rubber piece.

Figure 8:
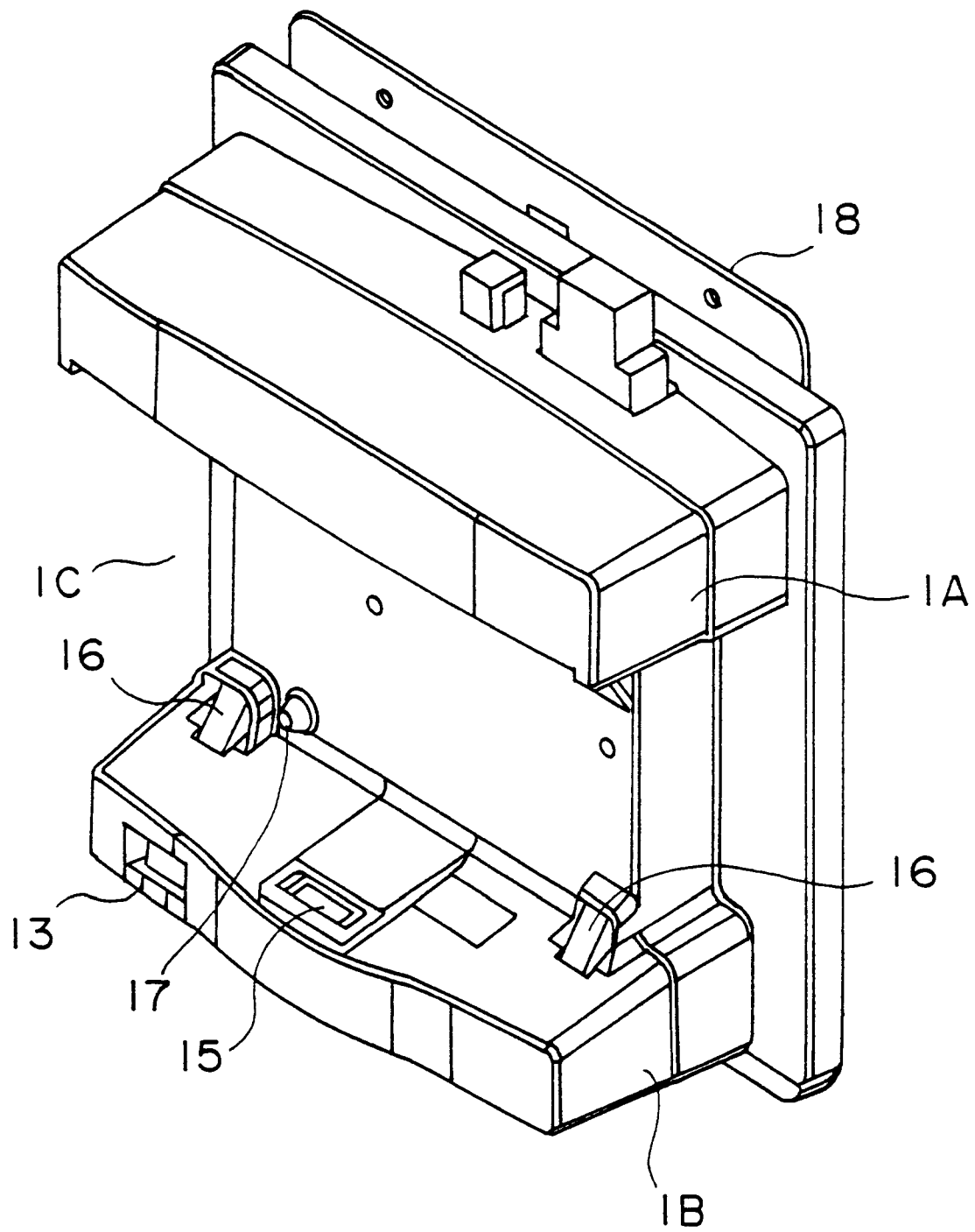
FIG. 8 is a diagram similar to FIG. 7 in a state that a lock mechanism is retracted.

FIG. 8 shows the same holder 1 of FIG. 7 in the state that the lock mechanism 15 is retracted into the upper base part 1B.

In the construction of FIG. 8, it should be noted that there is provided a movable pin 17 in the depression 1C of the holder 1 for engagement with the rear surface of the portable terminal device 2 mounted upon the foregoing depression 1C properly, wherein the engagement of the movable pin 17 with the portable terminal device 2 induces the lock mechanism 15 to come down from the retracted state of FIG. 8 to the state of FIG. 7 for engagement with the portable terminal device 2. In the state of FIG. 7, the movable pin 17 is pushed inside the body of the holder 1 and not illustrated.

Figure 9:
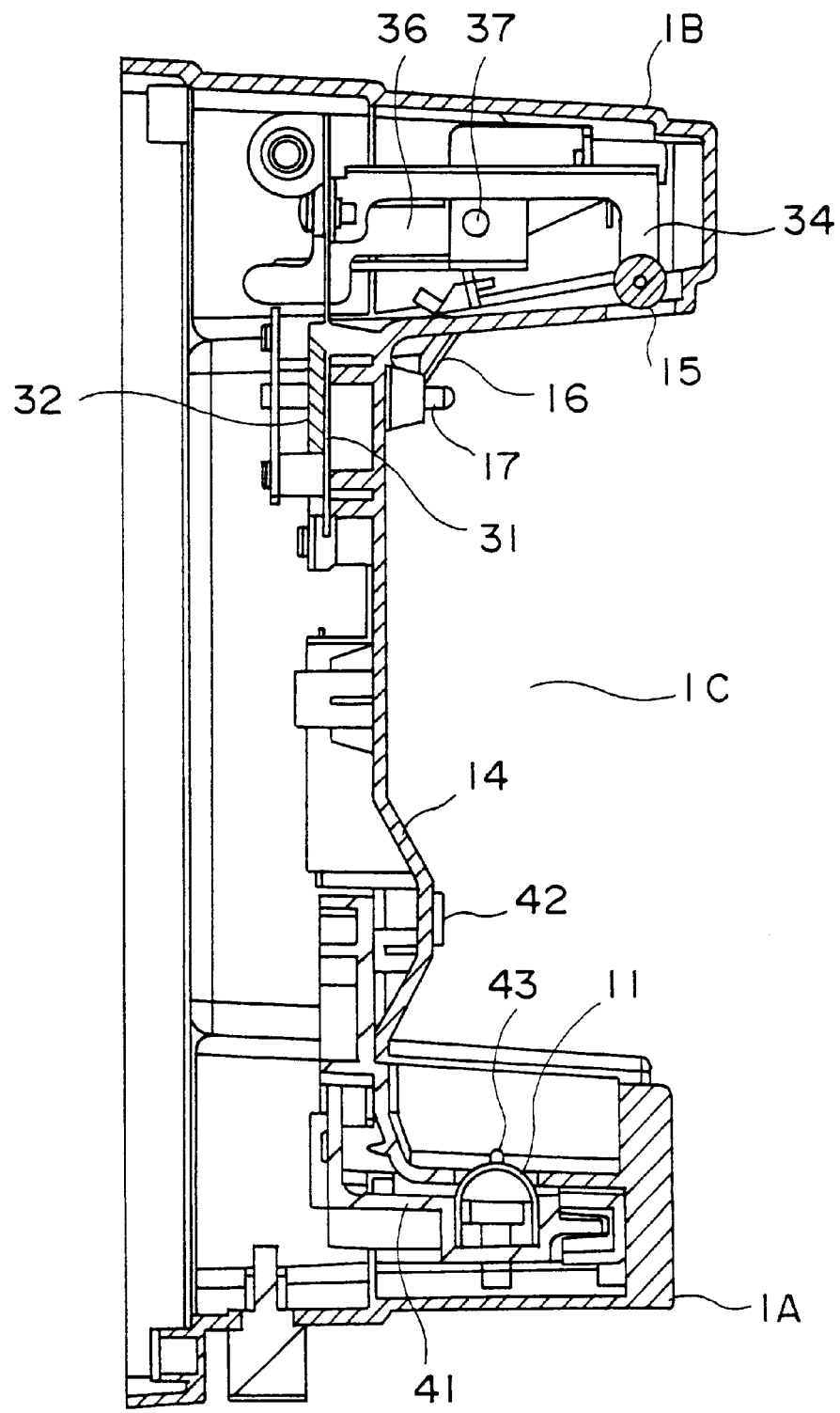
FIG. 9 is a cross-sectional view of the holder of the first embodiment of the present invention.
Figure 10:
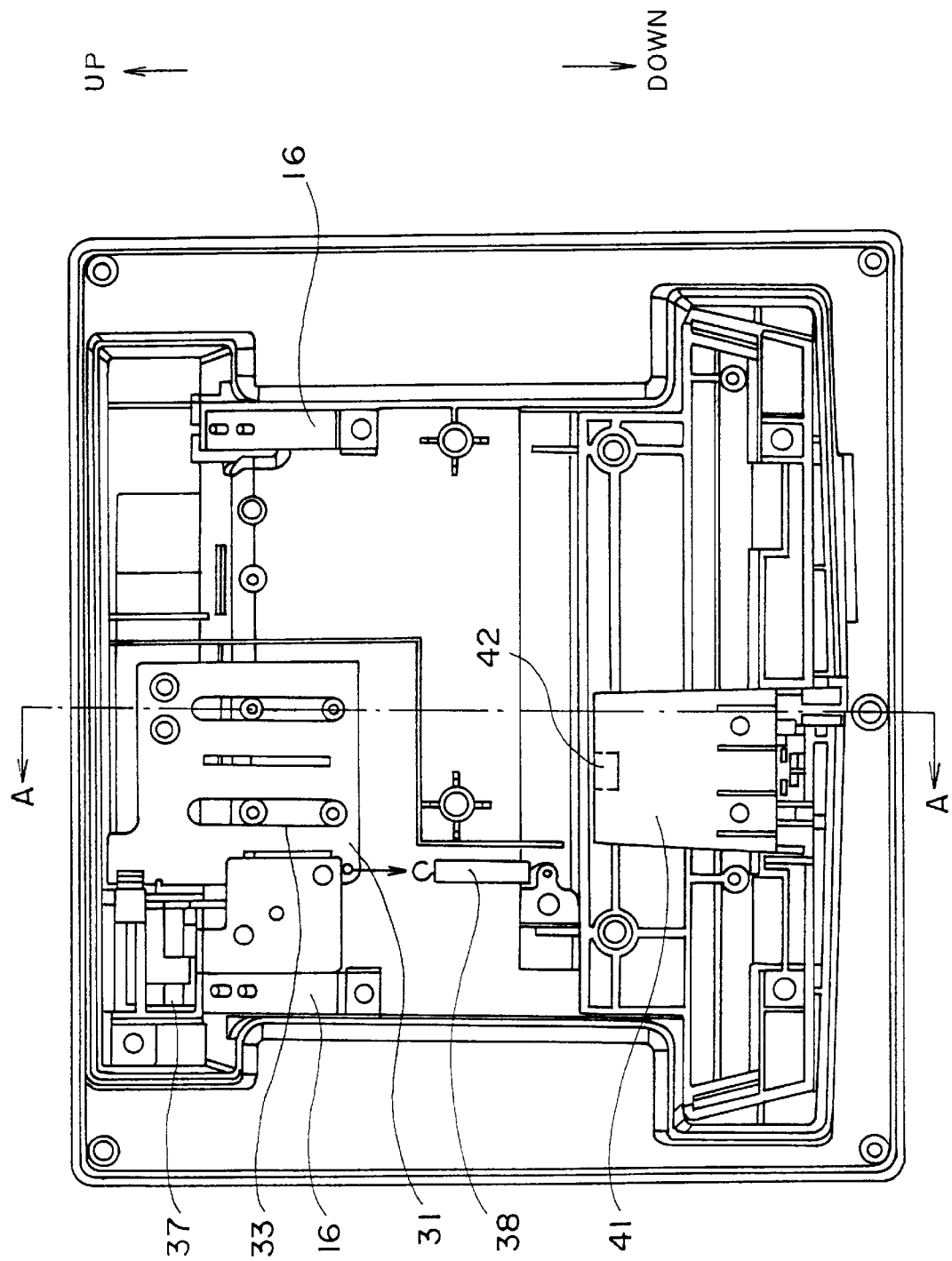
FIG. 10 is a diagram showing the holder of the first embodiment in a rear view.

FIG. 9 shows the elevational cross-section of the on-vehicle holder 1 in the state that the portable terminal device 2 is not mounted. Further, FIG. 10 shows the holder 1 in the rear view, with a state that a cover thereof is removed. It should be noted that the cross-sectional view of FIG. 9 is taken along a line 9—9 of FIG. 10. In the state of FIG. 9 in which the portable terminal device 2 is detached from the holder 1, the lock mechanism 15 is retracted into the upper base part 1B.

Referring to FIG. 9, the roller-like member of the lock mechanism 15 is held on an end of a L-shaped arm 34 having another end connected to a movable plate 31. As indicated in FIG. 10, the movable plate 31 includes a pair of elongating openings 33 and is mounted on a frame of the holder 1 by screws in a manner movable in the upward and downward directions. Thereby, the movable plate 31 is urged in the downward direction by a spring 38 as indicated in FIG. 10. In the illustration of FIG. 10, the spring 38 is not connected to the movable plate 31. This, however, is merely an artifact for the sake of illustration. An end of the spring 38 is connected to a small hole of the plate 31.

Figure 11:
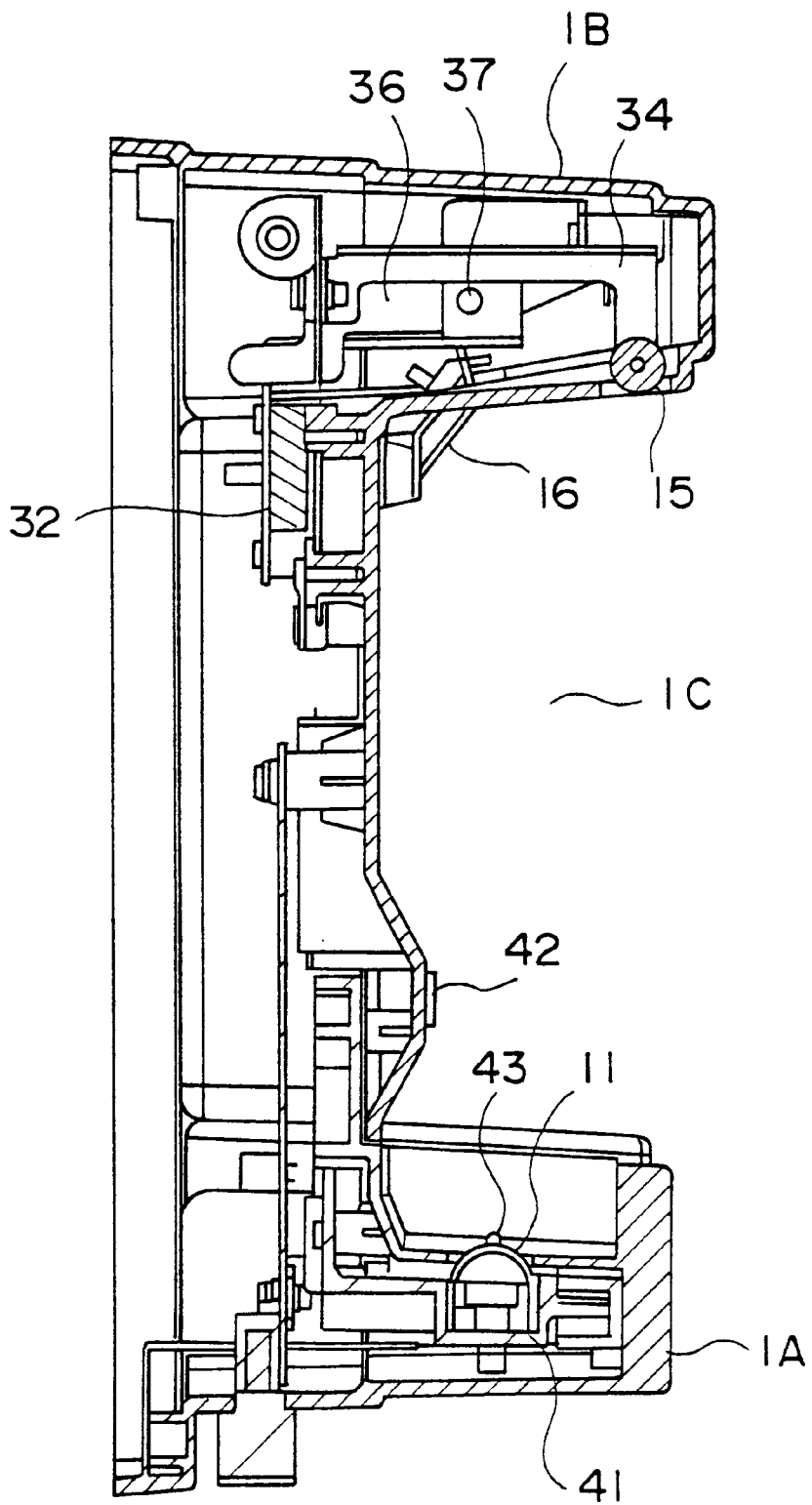
FIG. 11 is a cross-sectional diagram showing the holder of the first embodiment in a different state.

In the state that the lock mechanism 15 is retracted into the upper base part 1B, the movable plate 31 is locked by a lock plate 32 against the urging force of the spring 38, wherein the foregoing pin 17 is provided on a part of the lock plate 32. Thus, in response to the pressing of the pin 17 caused by the proper mounting of the portable terminal device 2 on the holder 1, the lock plate 32 is moved to the left from the state of FIG. 9 to a position shown in FIG. 11, and the lock of the plate 31 is released. Thereby, the lock plate 31 is pulled in the downward direction by the urging force of the spring 38, and the lock mechanism 15 jumps down from the upper base part 1B of the holder 1.

In order to return the lock mechanism 15 to the retracted state of FIG. 9, the release button 13 at the top part of the holder 1 is actuated. It should be noted that the release button 13 forms a part of a lever mechanism 36 rotatable about a fulcrum 37, and the lever mechanism 36 causes the plate 31 as well as the lock mechanism 15 to move in the upward direction in response to the actuation of the release button 13. Thereby, the lock mechanism 15 is retracted to the upper base part 1B of the holder 1.

In FIG. 9, it should be noted that the contact pin 43 for recharging the portable terminal device 2 is illustrated in the state that the contact in 43 is projected from the protective cover 11 although the portable terminal device 2 is not mounted upon the depression 1C between the upper and lower base parts 1B and 1A of the holder 1. This, however, is merely for the sake of convenience of illustration for clearly showing the contact pin 43. In the actual state of FIG. 9, the contact pin 43 is accommodated in the protective cover 11.

FIG. 10 shows the guide member 41 described previously and connected mechanically to the contact pins 43.

Referring to FIG. 10, the guide member 41 has a flat sheet-like form and carries the engagement pin 42 in the central part of the upper edge thereof for engagement with the corresponding depression of the portable terminal device 2 mounted on the holder 1. As explained with reference to FIG. 5, the guide member 41 is held movably in the upward and downward directions by causing the projection 41a not shown in FIG. 10 to engage with the corresponding elongating slot 41b, which is provided on the frame of the holder 1.

FIGS. 9 and 10 also show the leaf springs 16 at the top part of the depression 1C as explained already with reference to FIG. 7 or 8, wherein the leaf springs 16 hold the top part of the portable terminal device 2 mounted on the depression 1C of the holder 1 and urges the portable terminal device 2 in the right direction in the illustration of FIG. 9. Thereby, the portable terminal device 2 held in the depression 1C is urged firmly to the lock mechanism 15 which comes down in the state that the portable terminal device 2 is mounted, and the problem of rattling of the portable terminal device 2 in the holder 1 is eliminated. Further, the resilient shock absorbers 1c and 1d explained already with reference to FIG. 1 urge the mounted portable terminal device 2 in the right direction, and the rattling of the bottom part of the portable terminal device 2 is eliminated.

It should be noted that the foregoing resilient leaf springs 16 also facilitate the lock mechanism 15 to hold the mounted portable terminal device 2, by allowing the portable terminal device 2 to displace toward the holder 1 as the lock mechanism 15 goes down. When a rigid structure is used in place of the resilient leaf springs 16, the lock mechanism 15 may have been stacked at the top edge of the portable terminal device 2 as the lock mechanism 15 goes down in response to the release of the plate 31.

Figure 12:
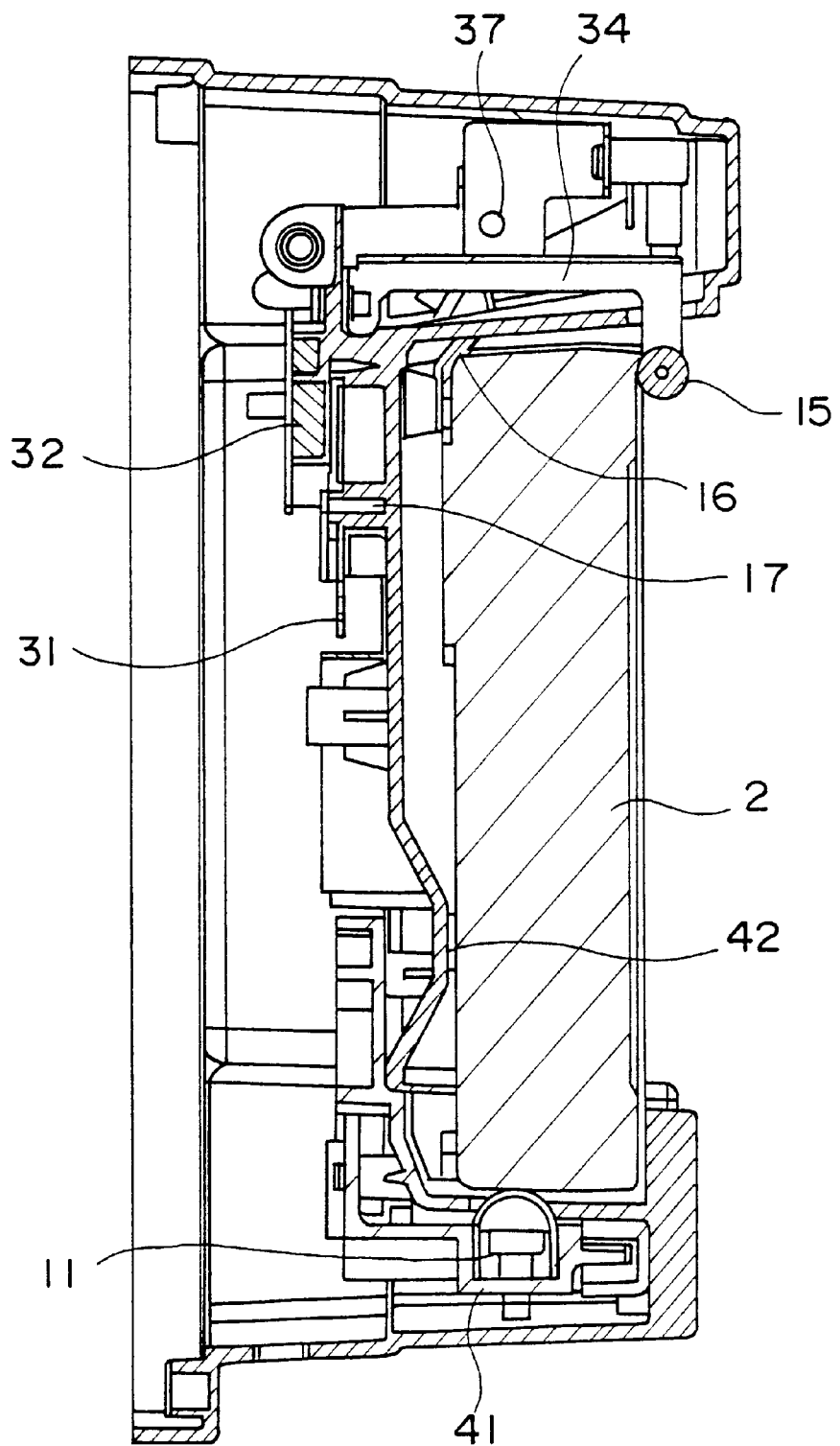
FIG. 12 is a cross-sectional diagram showing the holder of the first embodiment in a state a portable terminal device is mounted thereupon.

FIG. 12 shows the elevational cross-sectional view of the holder 1 in the state that the portable terminal device 2 is mounted thereon. Further, FIG. 13 shows the rear view of the holder 1 of FIG. 12, wherein the cross-sectional view of FIG. 12 is taken along a line 12—12 of FIG. 13.

Referring to FIG. 12, the lock mechanism 15 is in the lowered state and the lock mechanism 15 holds the front surface of the portable terminal device 2 at the top part thereof. Thereby, the portable terminal device 2 is urged to the right by the action of the leaf spring 16 as noted already. The roller of the lock mechanism 15 is formed of a resin, and the top part of the portable terminal device 2 is held firmly between the foregoing resin roller of the lock mechanism 15 and the leaf spring 16 against the rattling motion occurring in the direction substantially perpendicularly to the major surface of the portable terminal device 2.

Figure 13:
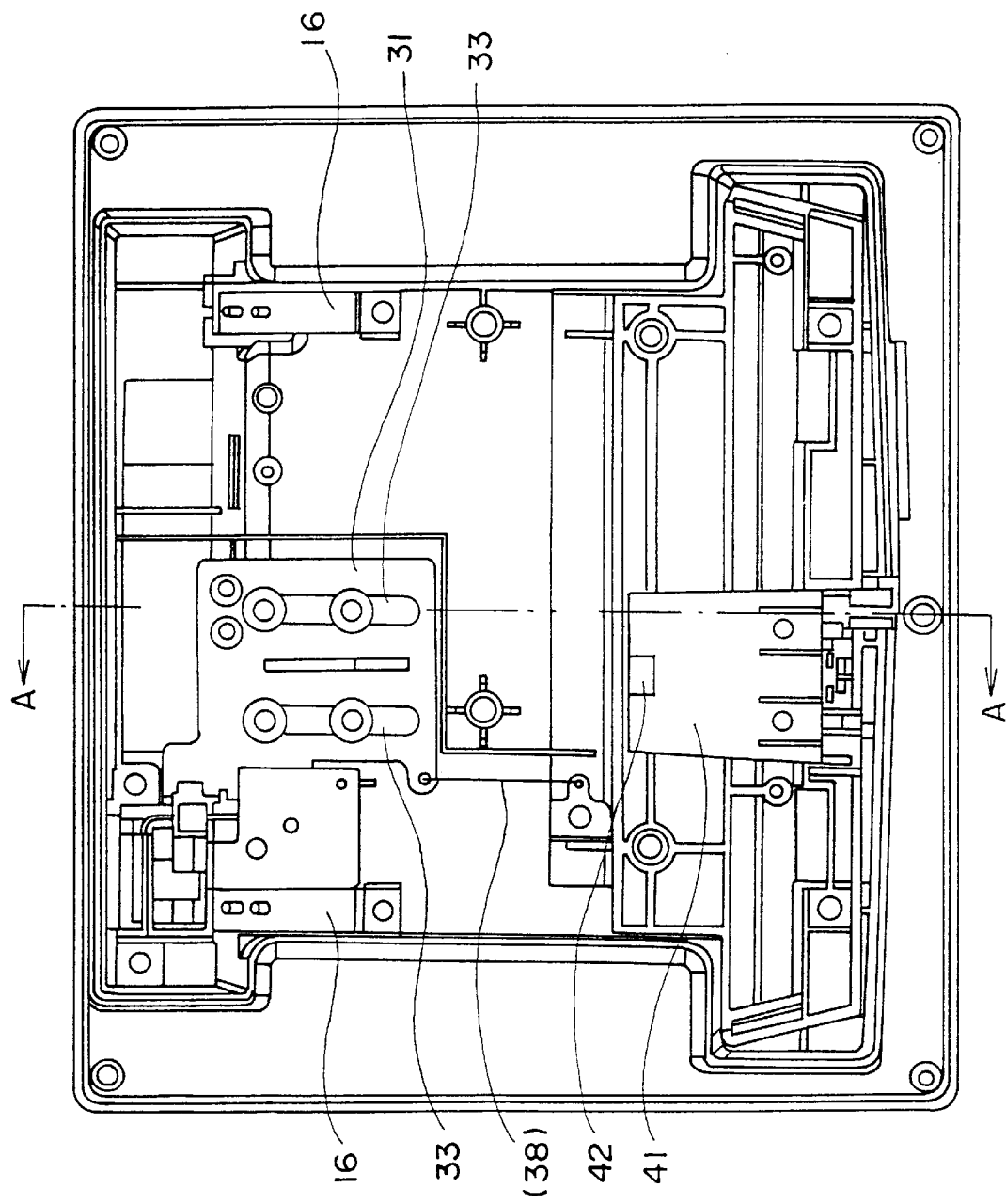
FIG. 13 is a diagram showing the holder of FIG. 12 in a rear view.

As indicated in FIGS. 12 and 13, the plate 38 to which the lock mechanism 15 is connected is urged in the downward direction by the spring 38. In correspondence to the lowering of the lock mechanism 15, it can be seen that the plate 31 indicated in FIGS. 12 and 13 is lowered as compared with the state shown in FIGS. 9 and 10.

In the state of FIG. 12, the pin 17 is also pushed inside the holder 1 by the rear surface of the portable terminal device 2, and as a result, the lock plate 32 is pushed to the left in the state of FIG. 12 as compared with the state of FIG. 9. Thereby, the plate 31 and the lock plate 32 are disengaged from each other.

In the state of FIG. 12, it should further be noted that the bottom of the portable terminal device 2 is contacted to the protective cover 11 and the protective cover 11 is pushed in the downward direction as indicated. Thereby, the contact pin 43, while not illustrated, protrudes from the opening 12 of the protective cover 11 and is urged against a corresponding terminal element of the portable terminal device 2 with a predetermined urging force. Thereby, the recharging of the battery of the portable terminal device 2 is achieved successfully and stably.

In FIG. 12, it should be noted that engagement pin 42, protruding from a part of the guide projection 14, engages the corresponding depression provided on the rear surface of the portable terminal device 2. As the engagement pin 42 is movable in the upward and downward directions in FIG. 9, the guide member 41, connected mechanically to the pin 42, moves up and down in correspondence to the up and down movement of the portable terminal device 2 in the holder 1 as explained already. Thereby, the foregoing predetermined urging force for urging the contact pin 43 to the corresponding contact terminal element of the portable terminal device 2 is more or less maintained constant.

Figure 14:
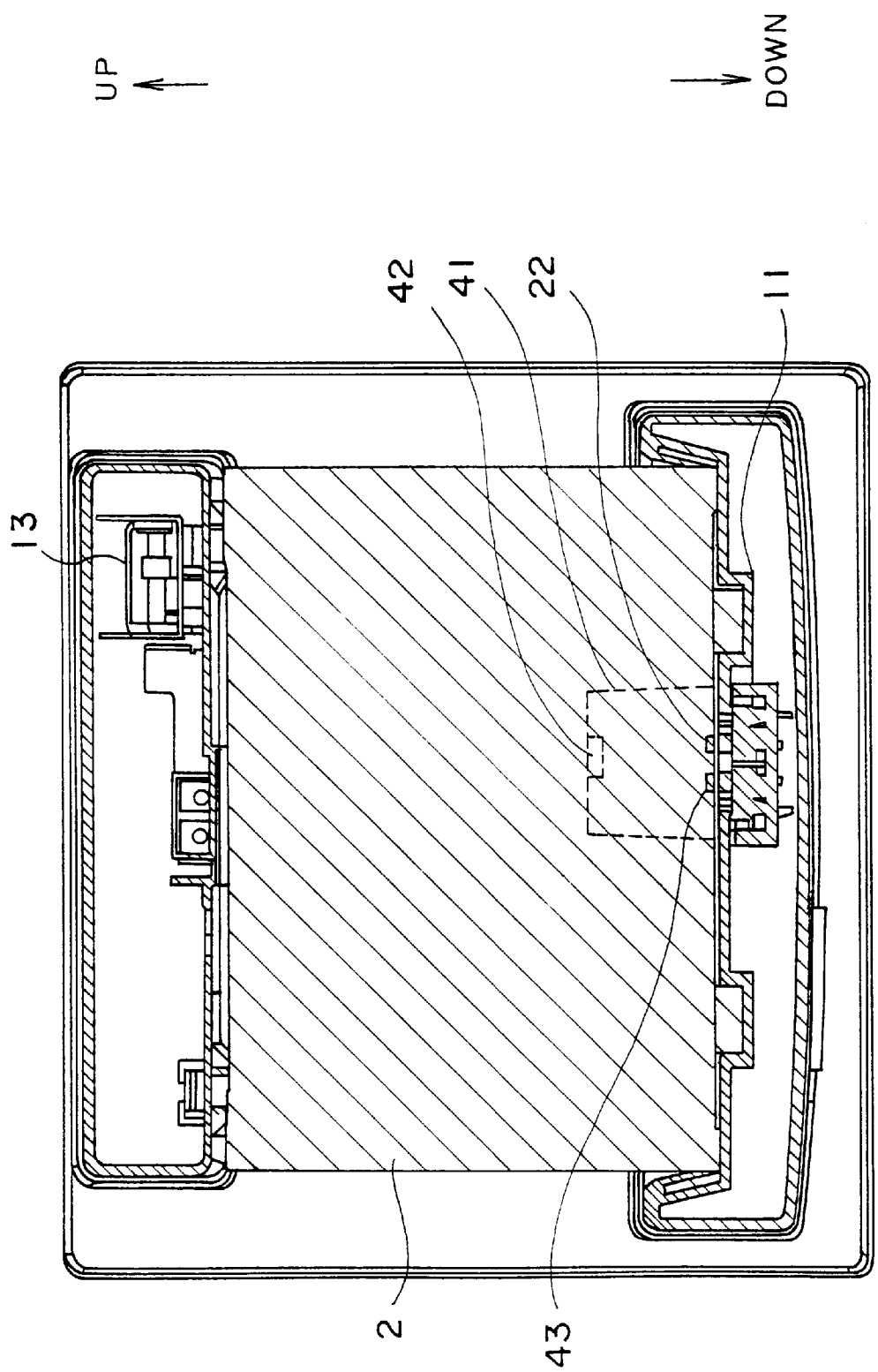
FIG. 14 is a cross-sectional diagram showing the holder of FIG. 12 as viewed from a front direction.
Figure 15:
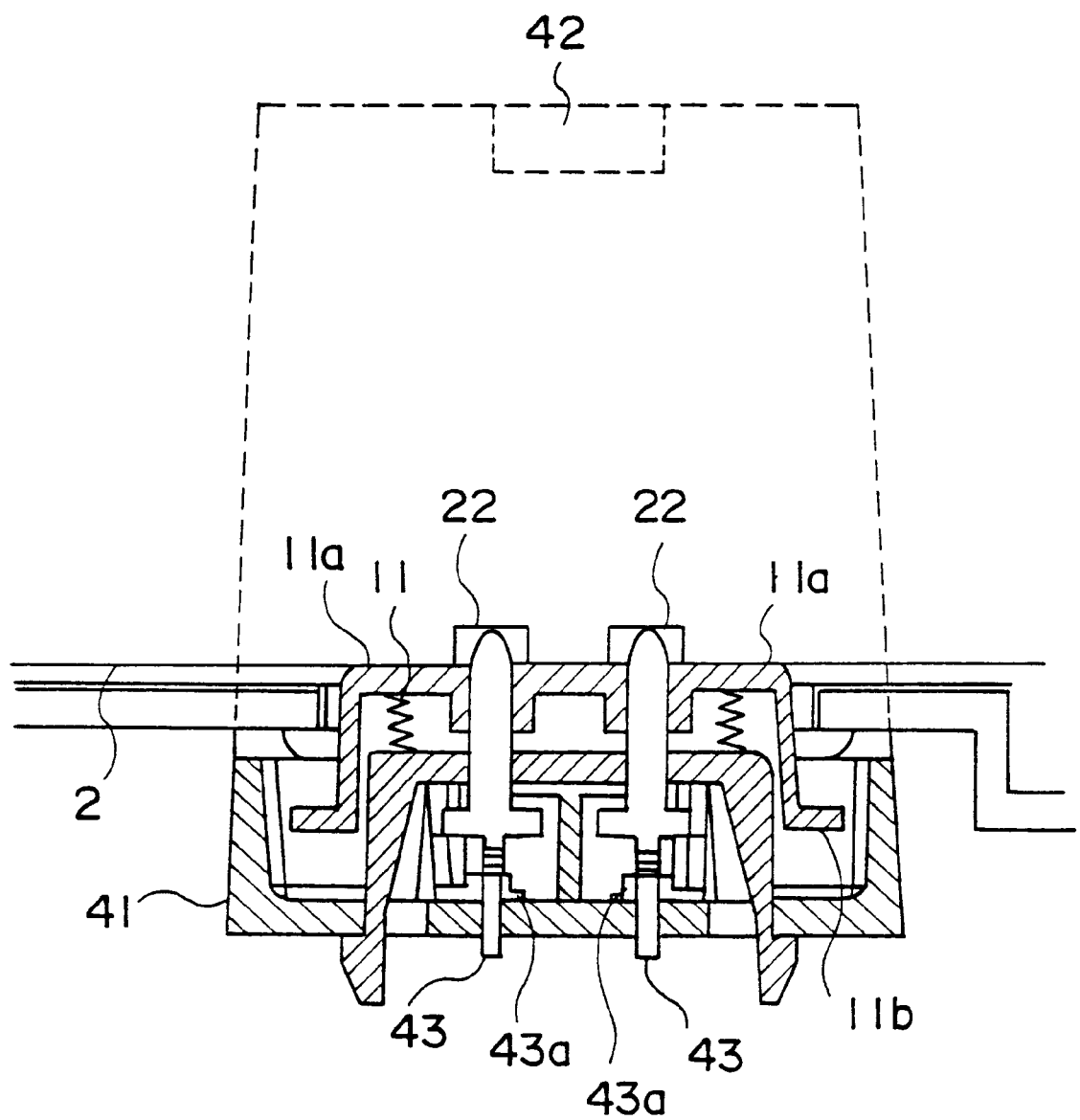
FIG. 15 is a cross-sectional diagram showing an urging mechanism of a contact pin used in the holder according to the first embodiment of the present invention.
Figure 16:
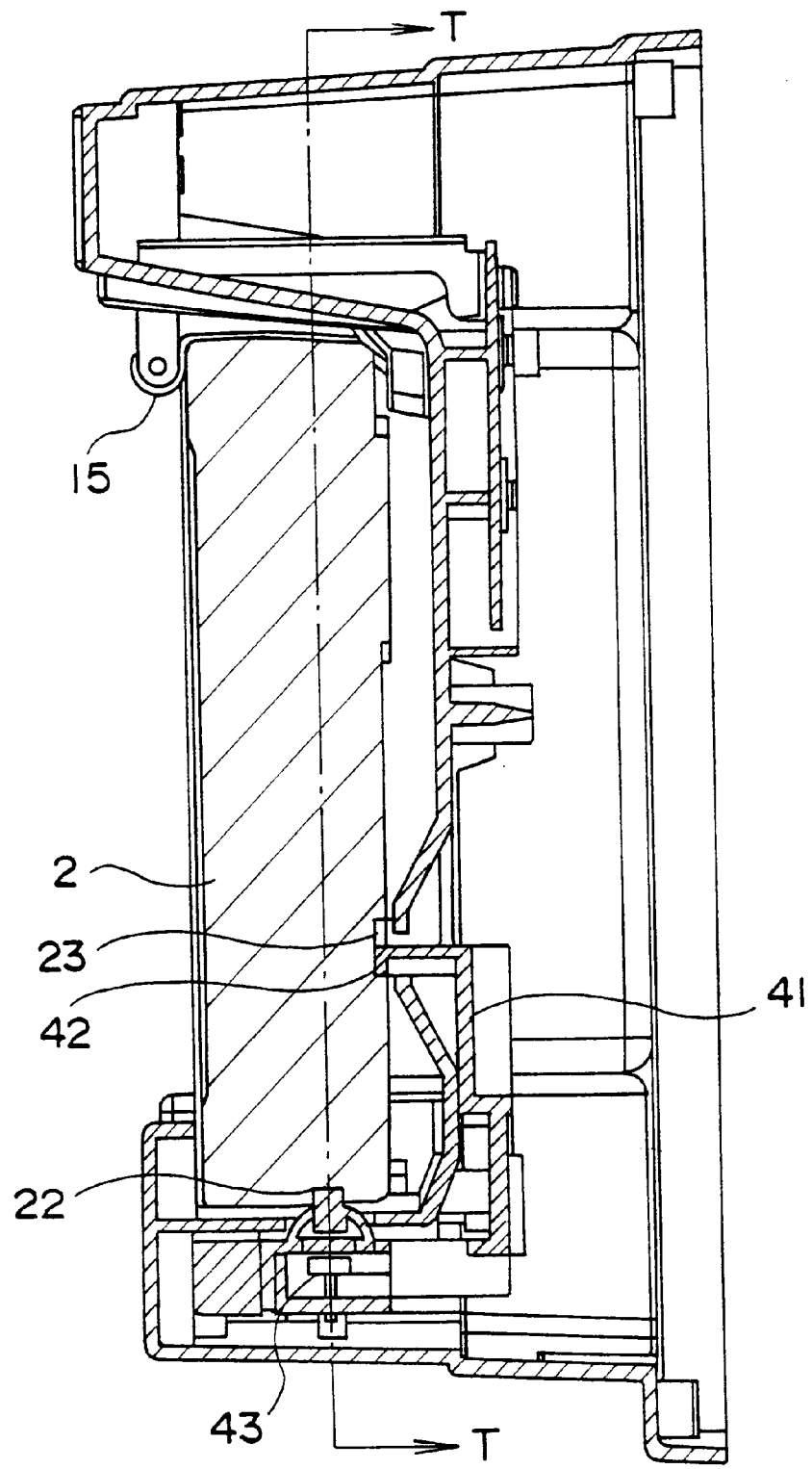
FIG. 16 is a cross-sectional diagram showing the holder of the first embodiment in a state in which a portable terminal device is mounted thereupon.
Figure 17:
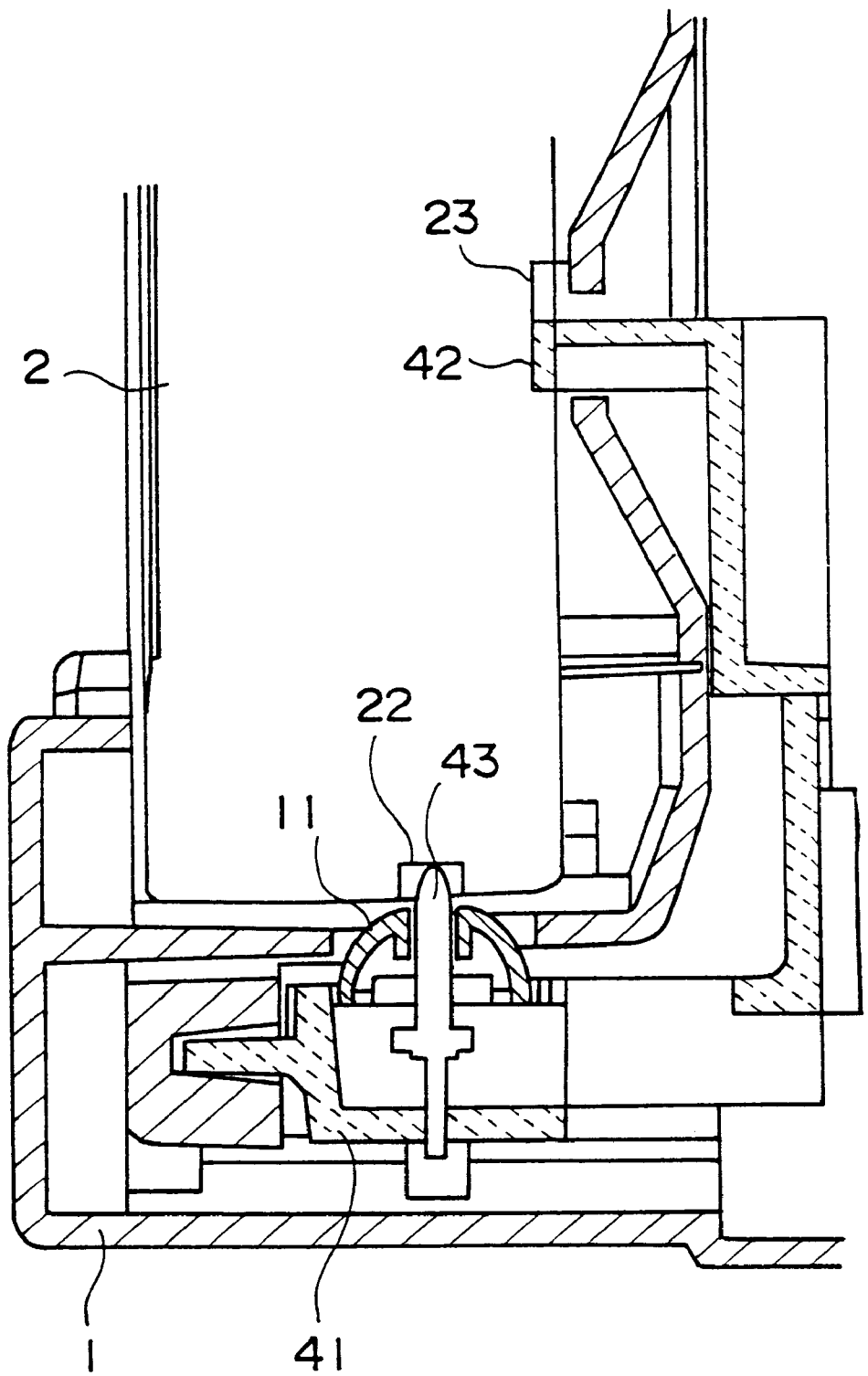
FIG. 17 is a diagram showing a contact between the holder and the portable terminal device thereon in an enlarged scale.

FIG. 14 shows the front cross-sectional view of the holder 1 in the state that the portable terminal device 2 is mounted upon the holder 1. Further, FIG. 15 shows a part of FIG. 14 including the contact pin 43 in an enlarged scale. Further, FIG. 16 shows the holder 1 in an elevational cross-sectional view in the state that the portable terminal device 2 is mounted upon the holder 1. It should be noted that the front cross-sectional view of FIG. 14 is taken along a line 14—14 of FIG. 16. Further, FIG. 17 shows the part of the holder 1 including the contact pin 43 in an enlarged scale.

Referring to FIGS. 14–17, the contact pin 43 is urged in the upward direction by the spring 43a with respect to the movable guide member 41 as noted already. Further, the protective cover 11 is urged also in the upward direction by the spring 11a as explained already. It should be noted that the protective cover 11 includes a part 11b acting as a stopper member preventing the protective cover 11 from coming off from the movable guide member 41.

In the state of FIGS. 14–17 in which the protective cover 11 is fully pushed in the downward direction by the bottom surface of the portable terminal device 2, the contact pin 43 is exposed from the opening 12 of the protective cover 11. The exposed contact pin 43 is inserted into the corresponding aperture 22 at the bottom surface of the portable terminal device 2 in contact engagement with the contact terminal element which is provided inside the foregoing aperture 22. The contact terminal element thereby supplies the electrical power supplied thereto from the holder 1 via the contact pin 43, to the rechargeable battery (not shown) inside the portable terminal device 2.

Figure 18A:
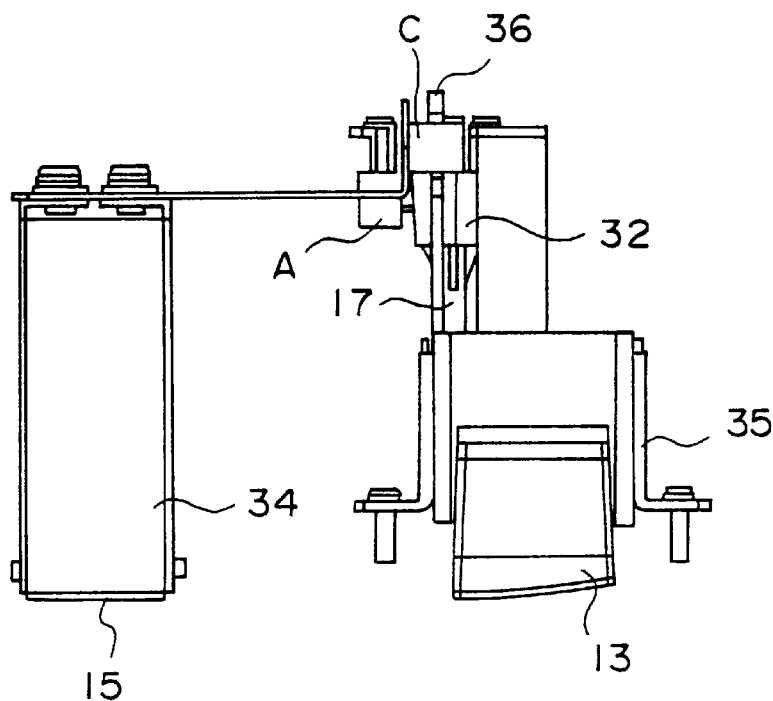
FIGS. 18A and 18B are diagrams showing a locking mechanism used in the first embodiment of the present invention.
Figure 18B:
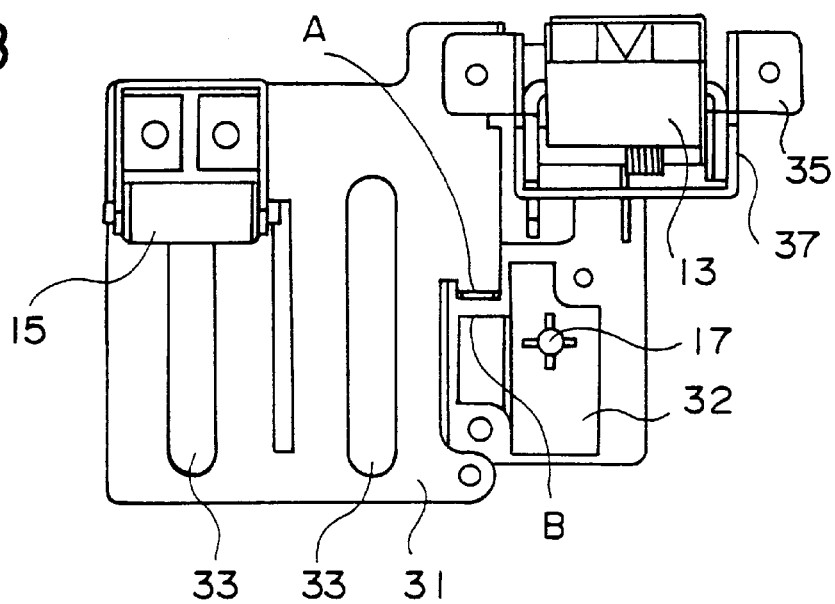
Figure 19:
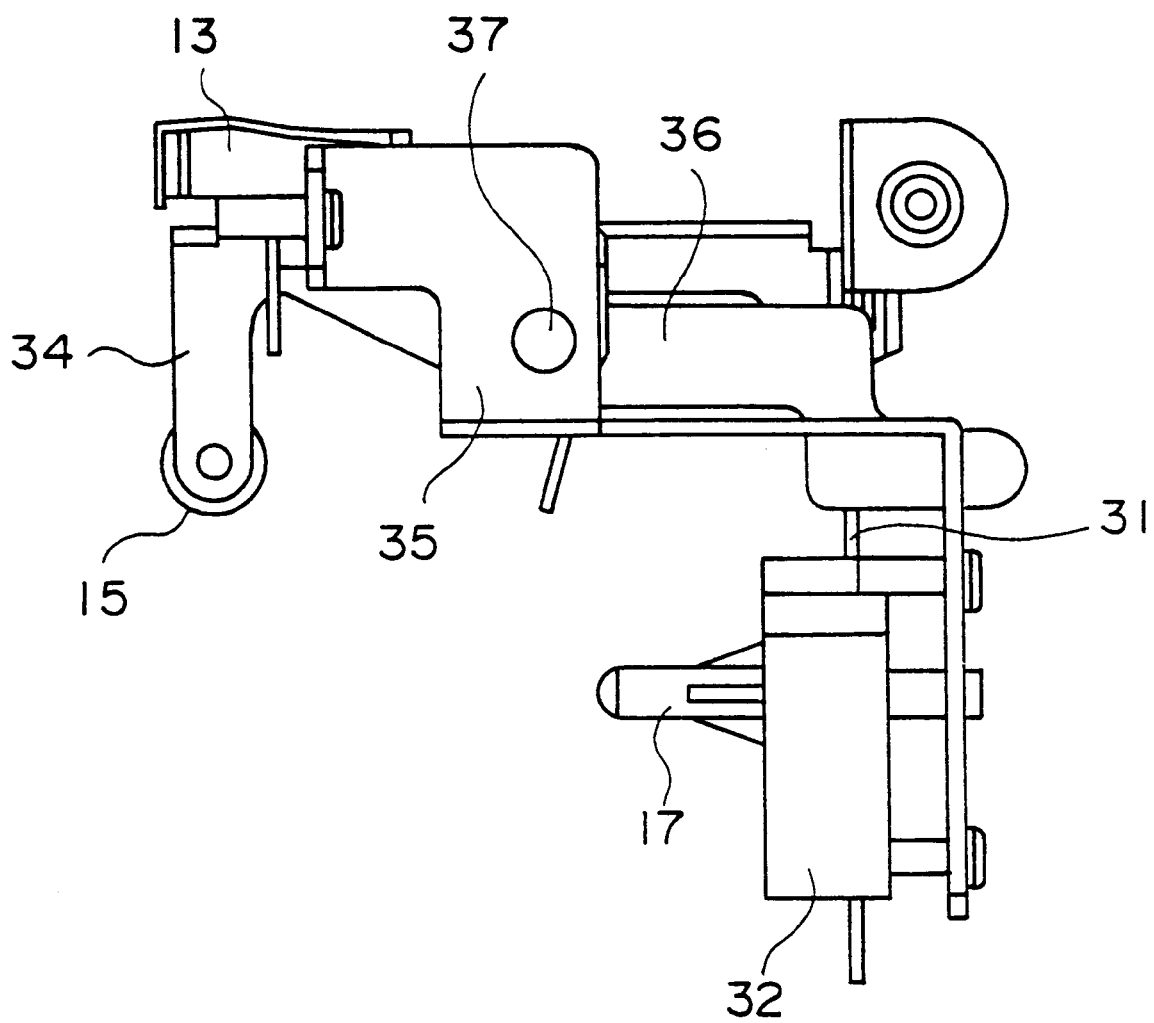
FIG. 19 is another diagram showing the locking mechanism used in the first embodiment of the present invention.

FIGS. 18A and 18B as well as FIG. 19 show the lock mechanism 15 respectively in a top view, front view and side view.

Referring to the drawings, it can be seen that the roller-like catch member of the lock mechanism 15 is connected to the movable plate 31 via the L-shaped arm 34. The L-shaped arm 34 is formed with a pair of elongated apertures 33 extending parallel with each other in the vertical direction, wherein the arm 34 is mounted on a frame of the holder 1 in a state movable in the upward and downward directions along the foregoing elongated apertures 33.

As indicated in FIG. 19, the lock plate 32 carries the movable pin 17 thereon as a unitary body, such that the movable pin 17 projects in the forward direction from the depressed surface of the holder 1 defining the depression 1C, wherein the foregoing pin 17 is urged in the forward direction by a spring not illustrated. As a result of the urging of the pin 17 by the spring, the pin 17 is projected from the foregoing depression 1C as long as the portable terminal device 2 is not mounted on the depression 1C.

As the plate 31 is urged in the downward direction by the spring 38 as noted already, the part A of the movable plate 31 and the part B of the lock plate 32 are contacted with each other in the state that the roller of the lock mechanism 15 is retracted to the upper base part 11B. Thereby, the part B of the lock plate 32 acts as a stopper member for preventing a further downward movement of the movable plate 31 in the lock state of FIG. 18B.

As indicated in FIG. 19 in particular, the lock release button 13 is movable about the fulcrum point 37, and the lever 36 at the other end of the fulcrum point 37 is located below a part C of the movable plate 31. Thus, the lever 36 moves in the upward direction in response to a pressing-down of the release button 13, wherein the lever 36 thus moving in the upward direction lifts up the part C of the movable plate 31 and hence the movable plate 31 itself in the upward direction. Thereby, the roller of the lock mechanism 15 is moved in the upward direction and the lock of the portable terminal device 12 is released. In the illustrated example, the release button 13 has an asymmetric shape in conformity with the outer shape of the holder 1. The release button 13 is mounted on the frame of the holder 1 via a press-shaped bracket 35.

[SECOND EMBODIMENT]

Figure 20B:
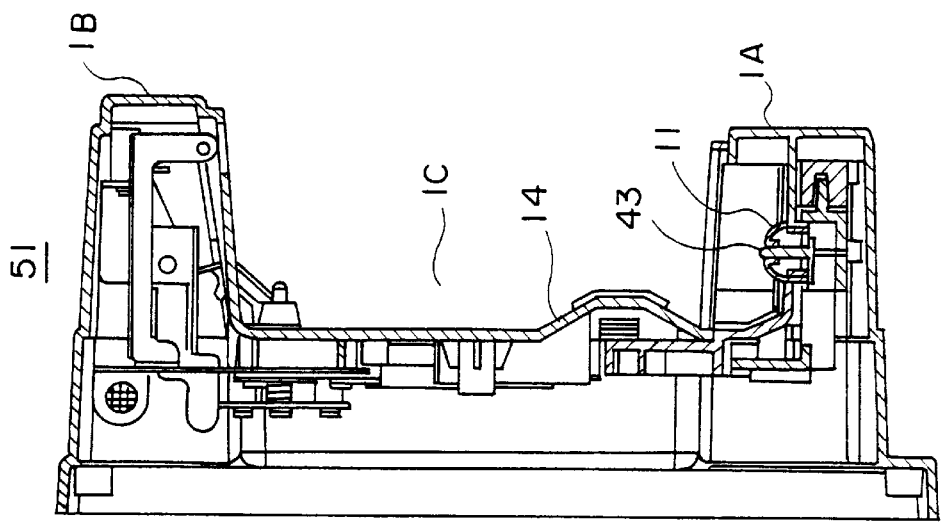
FIGS. 20A and 20B are diagrams showing the construction of a holder according to a second embodiment of the present invention respectively in a rear view and a cross-sectional view.
Figure 20A:
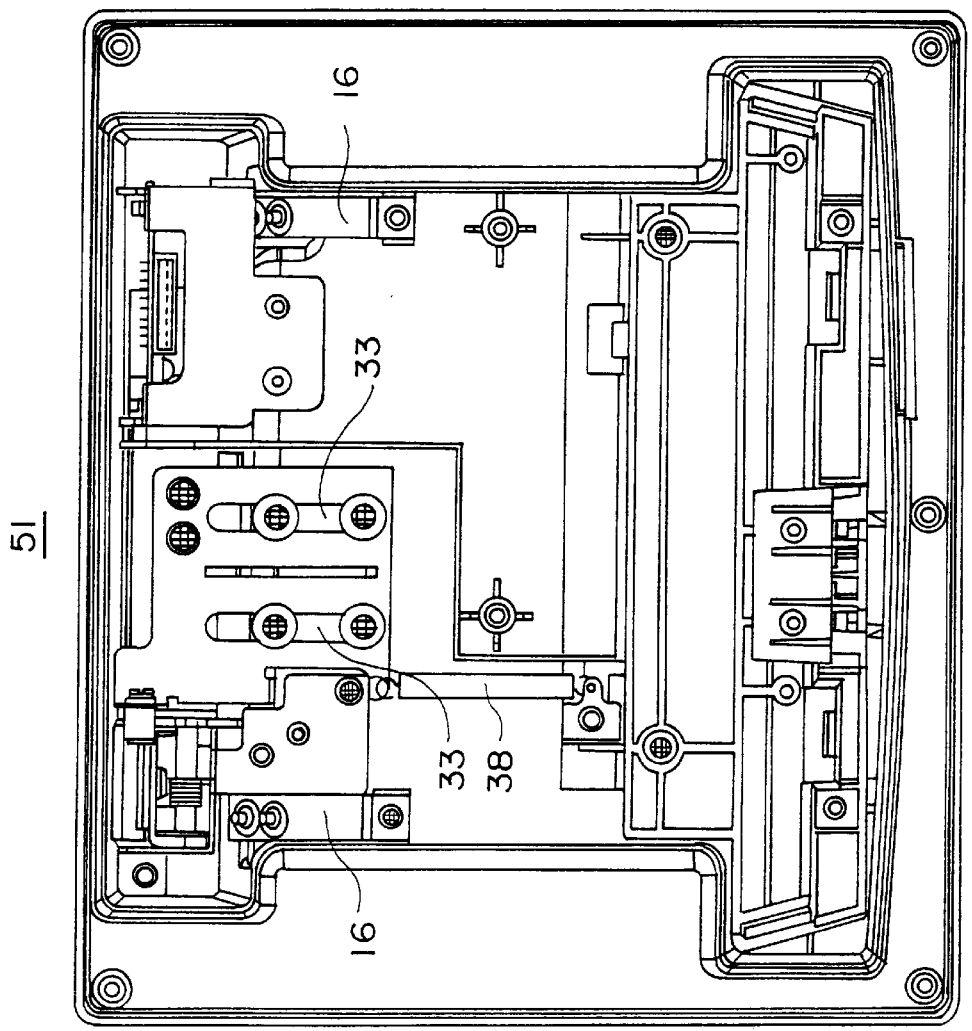

FIGS. 20A and 20B show the construction of a holder 51 according to a second embodiment of the present invention respectively in a rear view and an elevational cross-sectional view, wherein those parts corresponding to the parts described previously are designated by the same reference numerals and the description thereof will be omitted.

Referring to FIGS. 20A and 20B, the holder 51 has a construction similar to that of the holder 1 of the previous embodiment, except that the guide member 41 as well as the engagement pin 42 thereon are eliminated. Thereby, the protective cover 11 or the contact pin 43 are urged in the upward direction simply by the urging force of the spring 11a or 43a and the construction of the holder 51 is substantially simplified. Thereby, the cost of the holder 51 is reduced. In the present invention, it is no longer necessary to provide the depression on the portable terminal device 2 for accepting the projection 47.

FIG. 21 shows the mechanism of urging the contact pin 43 as well as the protective cover 11 used in the second embodiment in detail.

Referring to FIG. 21, the contact pin 43 is urged in the upward direction with respect to a frame 11F of the holder 1 by the spring 43a. The contact pin 43 has a collar part and urges a movable member 11G in the upward direction as it is urged by the urging force of the spring 43a. The movable member 11G carries a stopper part 11g that engages the foregoing frame 11F when the pin 43 is fully urged in the upward direction. In other words, the stopper part 11g of the movable member 11G determines the stroke that the contact pin 43 can move freely. Further, the protective cover 11 is mounted upon the movable member 11G by the spring 11a. Thereby, the maximum stroke of movement of the protective cover 11 is determined by the engagement of the stopper part 11b with the frame 11F. Thereby, both the contact pin 43 and the protective cover 11 can move in the elongating direction of the contact pin 43.

In the foregoing description, it should be noted that the holder 1 or 51 may be mounted upside down or in a state rotated with an arbitrary angle. Further, the movable contact pin 43 or the movable protective cover 11 may be provided not only on the lower base part 11A but also on the upper base part 11B.

The portable terminal device 2 is by no means limited to the one used for delivering parcels but the holder of the present invention is applicable to any portable electronic device such as a telephone handset or a portable computer. Further, the holder 1 of the present invention can be used not only in the vehicles used for delivering parcels but also in any vehicles or in stores or warehouses.

Further, the contact pin 43 may also be used for transferring data between the portable terminal device 2 and the holder 1.

Further, the present invention is not limited to the construction described heretofore, but various variations and modifications may be made without departing from the scope of the invention.

What is claimed is:

1. A holder adapted for holding a portable device detachably, said holder comprising:

depression formed in a body of said holder for accepting said portable device detachably;

a clamp mechanism for clamping said portable device in a state that said portable device is held in said depression;

a terminal element provided in said depression for electrical contact with said portable device;

a movable protective cover provided in said depression so as to cover said terminal element, said movable protective cover having a curved surface and being adapted to engage said portable device when said portable device is held in said depression, said movable protective cover being movable in an elongating direction of said terminal element between a first position covering said terminal element and a second position exposing said terminal element, said movable protective cover being urged to said second position when said portable device is mounted upon said depression, said movable protective cover being urged resiliently in a first direction to said first state along said elongating direction of said terminal element;

a base member movable generally in said first direction, said base member carrying a catch member adapted for engagement with said portable device held in said depression such that said base member moves together with said portable device; and a spring having a first end engaging said base member and a second end engaging said terminal element, said spring thereby urging said terminal element in said first direction with respect to said base member, said clamp mechanism including:

a movable clamp member movable between a clamp position, in which said clamp member engages said portable device held in said depression, and a release position, in which said clamp member is disengaged from said portable device held in said depression;

a clamp spring urging the movable clamp member to said clamp position; and a release lever engaging said movable clamp member for causing said movable clamp member to return to said release position in response to an actuation of said release lever.

2. A holder as claimed in claim 1, wherein said terminal element is movable in said elongating direction of said terminal element between a third position and a fourth position offset from said third position in said first direction, said terminal element being urged resiliently to said fourth position.

3. A holder as claimed in claim 2, wherein said terminal element includes a collar member, said second end of said spring engaging said collar member of said terminal element.

4. A holder as claimed in claim 3, wherein said base member is fixed to said body of said holder.

5. A holder as claimed in claim 3, wherein said holder further includes: another base member movable generally in said first direction, said another base member being urged by said collar member of said terminal element in said first direction; and another spring having a first end engaging said another base member and a second end engaging said movable protective cover, said another spring thereby urging said movable protective cover resiliently in said first direction to said first position.

6. A holder as claimed in claim 5, wherein said another base member includes a catch mechanism for holding said another base member with respect to said body of said holder such that said terminal element is held at said fourth position when said terminal element is fully urged in said first direction.

7. A holder as claimed in claim 6, wherein said movable protective cover includes a catch mechanism for holding said movable protective cover in said first position when said movable protective cover is urged fully in said first direction by said another spring.

8. A holder as claimed in claim 1, wherein said clamp mechanism further includes a movable contact member connected mechanically to said movable clamp member, said movable contact member being adapted for engagement with said portable device held in said depression, said movable contact member causing said movable clamp mechanism to disengage from said release lever in said release position and causing said movable contact member to move to said clamp position when said movable contact member engages said portable device.

9. A holder as claimed in claim 1, wherein said movable protective cover has a semi-cylindrical shape having a semi-circular cross-section, and wherein said protective cover has an opening for allowing said terminal member to be exposed when said movable protective cover is fully urged to said second position.

10. A holder as claimed in claim 1, wherein said body of said holder has a generally U-shaped cross-section.

11. A holder as claimed in claim 1, wherein said holder includes therein a circuit board for supplying electric power of said portable device to said terminal element.

12. A holder adapted for holding a device detachably, comprising:

a holder body holding said device detachably; and a clamp mechanism for clamping said device in a state that said portable device is held on said holder body;

said clamp mechanism including:

a movable clamp member movable between a clamp position in which said movable clamp member engages said device held on said holder body and a release position in which said clamp mechanism is disengaged from said device held on said holder body;

a clamp spring urging said movable clamp member to said clamp position;

a release lever engaging said movable clamp member for causing said movable clamp member to return to said release position in response to an actuation of said release lever;

a movable contact member connected mechanically to said movable clamp member, said movable contact member being adapted for engagement with said device held on said holder body, said movable contact member causing said movable clamp member to disengage from said release lever in said release position and causing said movable clamp member to move to said clamp position when said movable contact member engages said device.

13. A holder adapted for holding a portable device detachably, comprising:

a holder body holding a portable device detachably; and a contact structure provided on said holder body in electrical contact with said portable device held on said holder body, said contact structure comprising:

a contact pin movable; and a movable cover member having a curved surface and covering said contact pin, said movable cover member being movable in an elongating direction of said contact pin and including a hold exposing said contact pin;

said movable cover exposing said contact pin at said hole when said portable device is mounted on said holder body, said movable cover covering said contact pin when said portable device is removed from said holder body, said movable protective cover being urged resiliently in a first direction to said first state along said elongating direction of said terminal element;

a base member movable generally in said first direction, said base member carrying a catch member adapted for engagement with said portable device held in said depression such that said base member moves together with said portable device; and a spring having a first end engaging said base member and a second end engaging said terminal element, said spring thereby urging said terminal element in said first direction with respect to said base member, said clamp mechanism including:

a movable clamp member movable between a clamp position, in which said clamp member engages said portable device held in said depression, and a release position, in which said clamp member is disengaged from said portable device held in said depression;

a clamp spring urging the movable clamp member to said clamp position; and a release lever engaging said movable clamp member for causing said movable clamp member to return to said release position in response to an actuation of said release lever.

14. A holder as claimed in claim 13, wherein said movable cover is movable between a first position in which said contact pin is exposed at said hole and a second position in which said movable cover covers said contact pin, said movable cover being urged by a spring to said second position.

15. A holder as claimed in claim 14, wherein said contact structure is provided on said holder body such that said movable cover is urged to said first position when said portable device is mounted upon said holder body.

16. A holder as claimed in claim 13, wherein said cover has an arcuate shape when viewed from a direction perpendicular to said elongating direction of said contact pin.

17. A holder adapted for holding a portable device detachably, comprising:

a holder body holding said portable device detachably; and a contact structure provided on said holder body in electrical contact with said portable device held on said holder body, said contact structure comprising:

a contact pin movable in an elongating direction thereof;

a connection arm having a first end and a second end, said first end being connected rigidly to said contact pin so as to be movable in said elongating direction of said contact pin; and an engagement pin provided on said second end of said connection arm for engagement with said portable device mounted upon said holder body, such that said connection arm and said contact pin are movable together with said portable device when mounted upon said holder body.

* * * * *